US011636495B2

(12) United States Patent
Verma et al.

(10) Patent No.: US 11,636,495 B2
(45) Date of Patent: Apr. 25, 2023

(54) METHOD AND APPARATUS FOR MANAGING AN INTERFACE OF THE APPARATUS

(71) Applicant: Samsung Electronics Co., Ltd., Suwon-si (KR)

(72) Inventors: Manoj Verma, Noida (IN); Bhaskar Dutta, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 82 days.

(21) Appl. No.: 16/500,979

(22) PCT Filed: Jul. 16, 2018

(86) PCT No.: PCT/KR2018/008023
§ 371 (c)(1),
(2) Date: Oct. 4, 2019

(87) PCT Pub. No.: WO2019/017662
PCT Pub. Date: Jan. 24, 2019

(65) Prior Publication Data
US 2020/0034854 A1 Jan. 30, 2020

(30) Foreign Application Priority Data
Jul. 18, 2017 (IN) ............................ 201711025492

(51) Int. Cl.
*G06Q 30/00* (2012.01)
*G06Q 30/02* (2023.01)
*G06Q 30/0601* (2023.01)

(52) U.S. Cl.
CPC ......... *G06Q 30/02* (2013.01); *G06Q 30/0631* (2013.01); *G06Q 30/0633* (2013.01); *G06Q 30/0641* (2013.01)

(58) Field of Classification Search
CPC .......... G06Q 30/0257; G06Q 30/0269; G06Q 30/0277; G06Q 30/0251; G06Q 30/0255;
(Continued)

(56) References Cited

U.S. PATENT DOCUMENTS 8,438,069 B2 5/2013 Chong et al.
9,087,358 B1 * 7/2015 Giorgalli ............ G06Q 30/0641
(Continued)

FOREIGN PATENT DOCUMENTS

KR 10-0885615 B1 2/2009
KR 10-2013-0085665 A 7/2013
(Continued)

OTHER PUBLICATIONS

Yang, Mengke, et al. "The Evaluation System of New Digital Home Shopping Service." International Journal of Smart Home 9.6 (2015): 71-82. (Year: 2015).*
(Continued)

*Primary Examiner* — Matthew E Zimmerman
(74) *Attorney, Agent, or Firm* — Jefferson IP Law, LLP

(57) ABSTRACT

The disclosure refers to a method and a device for addition of products on an interface of a device. The method, as executed by the device, comprises receiving product-metadata and display-content, wherein the product-metadata represents at least one product to be displayed as part of the display-content. Further, an automatic addition of the at least one product or an analog thereof related to the product-metadata is enabled or triggered without a user-intervention on the interface provided on a device.

14 Claims, 24 Drawing Sheets

(58) Field of Classification Search
CPC ........... G06Q 30/0633; G06Q 30/0635; G06Q 30/0641
See application file for complete search history.

(56) References Cited

U.S. PATENT DOCUMENTS

| | | | |
|---|---|---|---|
| 9,922,327 B2 | 3/2018 | Johnson et al. | |
| 2002/0013950 A1* | 1/2002 | Tomsen ............... | H04N 21/254 725/51 |
| 2002/0194604 A1* | 12/2002 | Sanchez ............... | H04N 21/235 705/26.1 |
| 2006/0217110 A1* | 9/2006 | Othmer .................. | G06Q 30/02 455/414.1 |
| 2008/0140532 A1* | 6/2008 | Johnson ........... | H04N 21/25841 705/26.1 |
| 2009/0019061 A1* | 1/2009 | Scannell, Jr. ....... | G06F 16/9577 |
| 2011/0093875 A1* | 4/2011 | Simmons ........... | G06Q 30/0603 725/61 |
| 2011/0258049 A1* | 10/2011 | Ramer ............... | G06Q 30/0273 705/14.69 |
| 2012/0130851 A1* | 5/2012 | Minnick ............ | G06Q 30/0633 705/26.8 |
| 2012/0240150 A1* | 9/2012 | Low ................. | H04N 21/25816 705/26.35 |
| 2013/0144727 A1 | 6/2013 | Morot-Gaudry et al. | |
| 2013/0238426 A1* | 9/2013 | Mukhopadhyay ..... | G06Q 30/02 705/14.49 |
| 2014/0052571 A1 | 2/2014 | Raman | |
| 2014/0157303 A1 | 6/2014 | Jo | |
| 2015/0100458 A1 | 4/2015 | Linden et al. | |
| 2016/0360288 A1* | 12/2016 | Mandyam ............ | H04N 21/478 |
| 2018/0124473 A1* | 5/2018 | Patel .................. | H04N 21/4331 |

FOREIGN PATENT DOCUMENTS

| | | | | |
|---|---|---|---|---|
| KR | 10-2014-0047744 A | 4/2014 | | |
| RU | 2 607 786 C2 | 1/2017 | | |
| WO | WO-2010068556 A1 * | 6/2010 | ............. | G06Q 30/00 |

OTHER PUBLICATIONS

International Search Report dated Nov. 8, 2018; International Application No. PCT/KR/2018/008023.

Global B2C E-commerce Report 2016; Facts, Figures, Infographic & Trends of 2015 and the 2016 forecast of Ithe Global B2C E-commerece Market of the Goods and Services; www.ecommercefoundation.org; Jan. 12, 2016.

Indian Office Action dated Jun. 23, 2020; Indian Appln No. 201711025492.

* cited by examiner

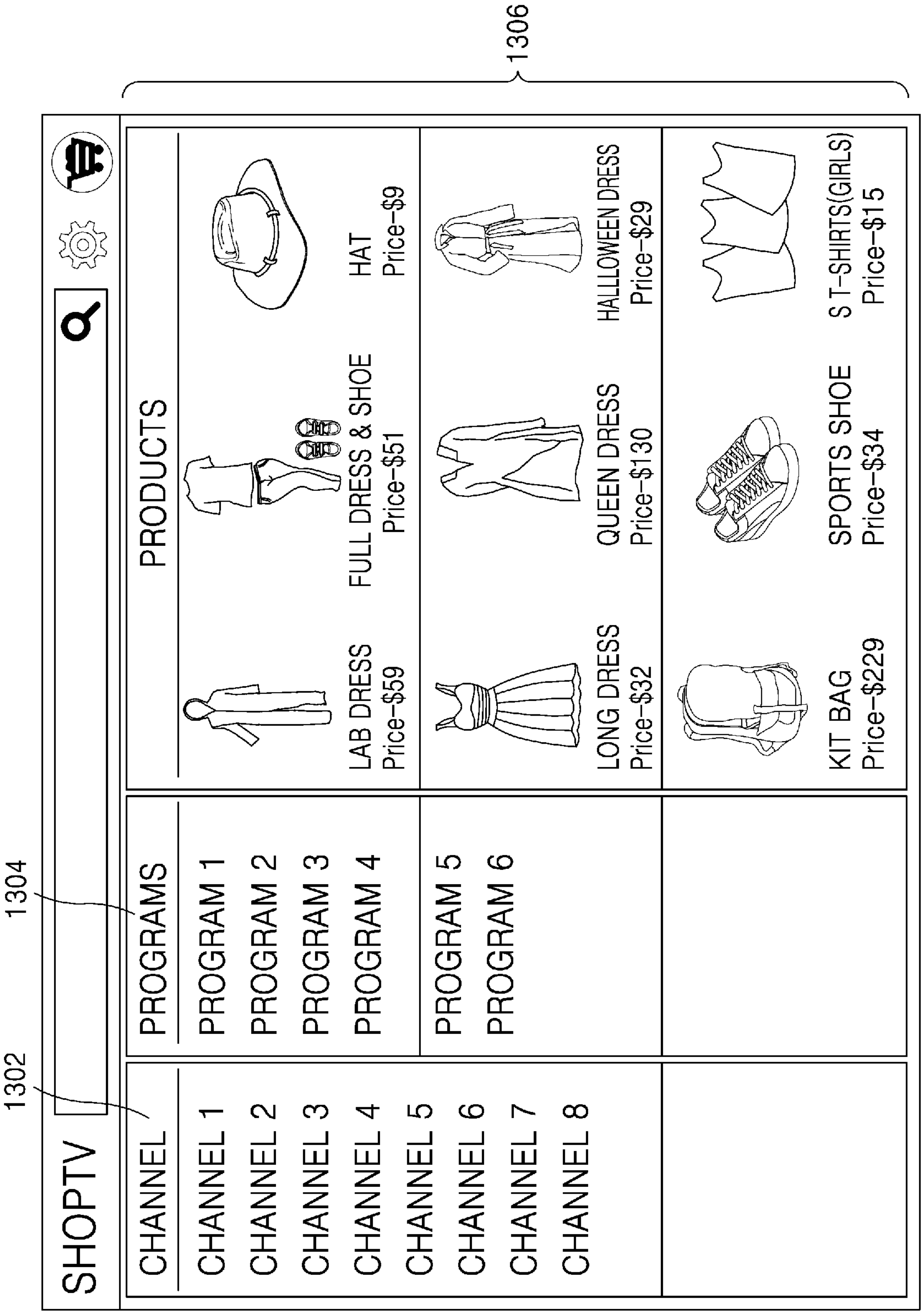

FIG. 13

| SHOPTV | | 1306 |
|---|---|---|
| CHANNEL | PROGRAMS | PRODUCTS 🔍 ⚙ 📷 |
| CHANNEL 1 | PROGRAM 1 | LAB DRESS — Price-$59 | FULL DRESS & SHOE — Price-$51 | HAT — Price-$9 |
| CHANNEL 2 | PROGRAM 2 | | | |
| CHANNEL 3 | PROGRAM 3 | LONG DRESS — Price-$32 | QUEEN DRESS — Price-$130 | HALLOWEEN DRESS — Price-$29 |
| CHANNEL 4 | PROGRAM 4 | | | |
| CHANNEL 5 | PROGRAM 5 | KIT BAG — Price-$229 | SPORTS SHOE — Price-$34 | S T-SHIRTS(GIRLS) — Price-$15 |
| CHANNEL 6 | PROGRAM 6 | | | |
| CHANNEL 7 | | | | |
| CHANNEL 8 | | | | |

1302 — CHANNEL column
1304 — PROGRAMS column
1306 — PRODUCTS section

METHOD AND APPARATUS FOR MANAGING AN INTERFACE OF THE APPARATUS

TECHNICAL FIELD

The present disclosure relates to display and computing devices, and in particular, to display and computing devices that extract information from broadcast-content.

BACKGROUND ART

With the rapid expansion of web-enabled services that allow users to browse a list of product items for later selection consumers have be-come keener in inspecting and observing items online, rather than visiting a physical establishment or brick and mortar store. For example, web users nowadays like visiting e-commerce sites for searching and buying products online based on user reviews, shipping and billing addresses, etc.

DISCLOSURE OF INVENTION

Solution to Problem

This summary introduces a selection of concepts in a simplified format, the concepts being further described in the detailed description of the disclosure. This summary is neither intended to identify key or essential inventive concepts of the disclosure, nor is it intended for determining the scope of the disclosure.

According to an aspect of the disclosure, a method and a system for addition of products on an interface of a device are provided. The method is executed by the system and comprises receiving a product-metadata and content, wherein the product-metadata represents at least one product to be displayed as part of the content. Further, an automatic addition of the product or an analog related to the product-metadata is enabled or triggered at an interface provided at a display-device and/or a computing-device without user-intervention.

According to another aspect of the disclosure, an addition of a product or an analog related to the product metadata is triggered at an interface of a web-enabled application rendered on the display-device and/or the computing-device, without user-intervention. Then, the product as added is depicted in a mapped relationship with the content.

Advantageous Effects of Invention

The present disclosure enables users to add products introduced on TV or any broadcasting network to an interface of a device automatically and intuitively.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein:

FIG. 13 illustrates an electronic interface in accordance with an exemplary embodiment of the disclosure;

Figure 1:
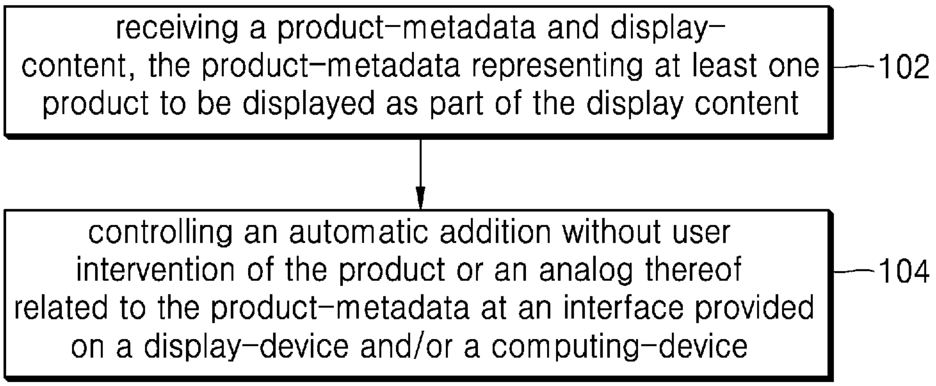
FIG. 1 illustrates a method of managing an interface of a device in accordance with an embodiment of the disclosure.

Further, one of ordinary skill in the art will appreciate that the elements in the drawings are illustrated for simplicity and may not have been necessarily been drawn to scale. For example, the flowcharts illustrate methods of the disclosure in terms of the most prominent operations thereof to help the understanding of the aspects of the disclosure. Furthermore, in terms of the construction of devices of the disclosure, one or more components of the devices may have been represented in the drawings by conventional symbols, and the drawings may show only specific details that are pertinent to understanding the aspects of the disclosure so as not to obscure the drawings with details that will be readily apparent to those of ordinary skill in the art.

BEST MODE FOR CARRYING OUT THE INVENTION

In an embodiment, the disclosure refers to a method and a system for an addition of products on an interface of a device. The method as executed by the system comprises receiving product-metadata and content, wherein the product-metadata represents at least one product to be displayed as part of the content. Further, an automatic addition of the at least one product or an analog thereof related to the product-metadata is enabled or triggered without user-intervention at an interface provided at the device, which may be a display-device and/or a computing-device.

In another embodiment, the disclosure refers to a method and a system for an addition of products at an interface on a device. The method as executed by the system comprises receiving product-metadata and content, wherein the product-metadata represents at least one product to be displayed as part of the content. Thereafter, an addition of the at least product or an analog thereof related to the product-metadata is triggered without user-intervention at an interface of a web-enabled application rendered on the device, which may be a display-device and/or a computing-device. The product as added is depicted in a mapped relationship with the display-content.

In another embodiment, the disclosure refers to a method and system for an addition of products on an interface of a device. The method as executed by the system comprises receiving at least one product-metadata and display-content, the product-metadata representing at least one product to be displayed as part of the display-content. A web-enabled service-provider is identified based on the product-metadata. An addition of the at least one product or an analog thereof related to the product-metadata is triggered without user intervention at an interface of the service-provider. The interface of the service provider is rendered on the device, which may be a display-device and/or a computing device.

According to an embodiment, the addition of the at least one product or an analog thereof related to the product-metadata is triggered in a mapped relationship with the display-content.

In another embodiment, the disclosure refers to a method and system for an addition of products on an interface of a device. The method as executed by system comprises receiving at least one product-metadata and display-content, the product-metadata representing at least one product to be displayed as part of the display-content. The addition of the at least one product or an analog thereof related to the product-metadata is triggered without user intervention at an interface of a web-enabled service provider. Such addition partly comprises sending product-details to a web content-manager of the web-enabled service provider for updating a user's account maintained by a content-manager based on the product-metadata. The content-manager may be any entity authorized to add same or analogous products based on received metadata to a user's account/cart, through a corresponding service provider website.

In another embodiment, the disclosure refers to a method and system for an addition of products on an interface of a device. The method as executed by system comprises receiving product-metadata and display-content, wherein the product-metadata represents at least one product to be displayed as part of the display-content. An addition of the at least one product or an analog thereof related to the product-metadata is triggered without a user intervention at an interface provided on the device, which may be a display-device and/or a computing-device. Accordingly, the user is allowed to select the one or more of added products from the interface, and user access to the selected products is enabled from one or more web-enabled service providers.

Based at least on an improved operation as rendered by the disclosure, a product which appears in display-content (i.e., playing multimedia) and details available on a website can be directly added to an electronic user interface (i.e, a cart) without user interaction. In an example, products may be directly added to an electronic user interface like an e-commerce (E-com) cart so that a user can instantly purchase products of his/her choice from the e-com cart. Since the products are added for exploration without user-selection, no disturbance is incurred. The added products may be accessed anytime after the addition from the interface and dealt with (e.g., shopped).

Overall, the disclosure prevents disturbance or distraction of other viewers currently watching the media-content containing the products that may be explored by the user, while ensuring that the product gets automatically logged at an interface at the backend. Accordingly, in an example, viewership of the media content and the formation of a log of corresponding products of the media content may occur simultaneously.

To further clarify the advantages and features of the present disclosure, a more detailed description of the disclosure will be rendered with reference to specific embodiments thereof, which are illustrated in the appended drawings. These drawings depict only examples of the embodiments of the disclosure and are therefore not to be considered as limiting the scope of the disclosure. The disclosure will be also described and explained in conjunction with the accompanying drawings.

MODE FOR THE INVENTION

For the purpose of promoting an understanding of the principles of the disclosure, reference will now be made to the embodiments illustrated in the drawings and specific language will be used to describe the same. It will nevertheless be understood that no limitation of the scope of the disclosure is thereby intended, and alterations and further modifications of the illustrated system and further applications of the principles of the disclosure as illustrated therein would be normally apparent to one of ordinary skill in the art to which the disclosure relates.

It will be also understood by one of ordinary skill in the art that the foregoing general description and the following detailed description are just explanatory of the disclosure and are not intended to be restrictive of the scope thereof.

Reference throughout the disclosure to "an aspect", "another aspect", or similar language means that a particular feature, structure, or characteristic described in connection with a particular embodiment is included in other embodiments of the disclosure. Thus, the phrase "in an embodiment", "in another embodiment", and similar language throughout the disclosure may, but do not necessarily, all refer to the same embodiment.

The terms "comprises", "comprising", or any other variations thereof, cover a nonexclusive inclusion, such that a process or method that comprises a list of operations does not include only those operations but may include other operations not expressly listed or inherent to such process or method. Similarly, one or more devices, sub-systems, elements, structures, or components proceeded by "comprises . . . a" do not, without more constraints, preclude the existence of other devices or other sub-systems, other elements, other structures, or other components, additional devices, additional sub-systems, additional elements, additional structures, or additional components.

Unless otherwise defined, all technical and scientific terms used herein have the same meaning as commonly understood by one of ordinary skill in the art to which this disclosure belongs. The system, methods, and examples provided herein are illustrative only and not intended to be limiting of the scope of the disclosure.

Embodiments of the present disclosure will be described below in detail with reference to the accompanying drawings.

The user's penchant for locating a product or browsing the web to search for buying the product is usually triggered by use of the product by actors or celebrities who appear in television broadcast transmitted through terrestrial television, satellite television, internet TV, etc. In other words, viewers have a great tendency to locate products and services that appear in a broadcast (movie, music show, event etc.) For example, viewers are more eager to buy the same or similar dresses, watches, cars, shoe, glasses, etc. that celebrities or sportsmen/women are using in a movie, video, sport game, show, etc.

A user, upon be-coming in products shown in a television broadcast or streamed images, usually resorts to browsing the Internet for locating the products. However, such an effort is usually too passive in nature and yields only result based on the search-capability of the user over the web, thereby being unpredictable in nature and varying from person to person.

The problem further worsens when the user, after having observed products in a television broadcast or stream, wants to further find out details about the products and browse the web for them after some time. This essentially necessitates the user to remember the products or externally store details about the products to check them out later on. The searching capability of the user over the web also remains as a bottleneck.

Likewise, if the user misses a television broadcast but still wishes to explore and browse the web for products associated thereto, the user has to view the missed broadcast (if the user-arranged recording) in order to observe/inspect the products shown therein through searching over websites or through an interactive television. These problems also remain non-addressed.

As a solution, a user may be provided with options to operate upon a current broadcast/stream through an interactive television mechanism and manually select the products in real-time for later usage. However, such an action distracts other users watching the same broadcast.

Accordingly, there is a need for a method and device to assist a user to explore and access products depicted in a television broadcast, without requiring the user to remember and search for the products manually.

There is another need for a method and device to assist a user to explore and access products forming part of a broadcast based on historical or already transmitted broadcasts.

There is yet another need for a method and device to assist a user to explore and access products forming part of a broadcast without interfering in broadcast-viewership of other users.

Throughout the description, the terms of a content and display-content may be used interchangeably.

A method of managing an interface of a device is provided. The method comprises receiving product-metadata and display-content, the product-metadata representing at least one product to be displayed as part of the display-content; and enabling an automatic addition, without user intervention, of the at least one product or an analog thereof related to the product-metadata on the interface provided at the device, wherein the device comprises a display device or a computing device.

In another embodiment, the interface comprises an electronic graphical user interface capable of displaying the added product along with details of the added product.

In another embodiment, the product-metadata is received from at least one of a source of the display-content; and a source different than the source of the display-content, wherein the source of the display-content and the source different than the source of the display-content are accessible either wirelessly or through a wired connection.

In another embodiment, the product-metadata pertains to products equivalent or similar to products present in the display-content and comprises at least one of QR code, watermarking, or a data-representation encoded in a predetermined format, a URL, a product code, or a product category.

In another embodiment, the at least one product and/or the analog thereof are automatically and selectively added based on at least one setting configured by the user, the at least one setting pertaining to at least one category of the product; at least one feature of the product, comprising at least one of a type, a color, and a reward-on-purchase; at least one television-program; one or more user-profile; and at least one television channel.

In another embodiment, prior to the adding, the method further comprises filtering the received product-metadata based on user-defined parameters of the display-content; and storing the filtered product-metadata to cause the automatically adding of the at least one product based on the setting configured by the user.

In another embodiment, the adding comprises fetching relevant information about the at least one product from an external source based on the filtered-metadata for displaying the relevant information alongside the added at least one product.

In another embodiment, the adding comprises at least one of annotating the added at least one product with an identifier; and generating an alert-notification with respect to each of the added at least one product.

In another embodiment, the method further comprises displaying the at least one product or analog thereof in a mapped state with the one or more parameters of the display-content, one of more parameters being at least one of a television-channel name, a tele-serial name, a thumbnail-impression of the display-content comprising the product.

In another embodiment, the method further comprises allowing the user to filter the at least one product or analog thereof based on the one or more associated parameters through the interface.

In another embodiment, the method further comprises allowing a user to access the added at least one product or analog thereof through the interface from an electronic program guide or an equivalent interactive program guide, the access being based on a selection of at least one historical or currently-broadcast event in respect of the display-content from the electronic program guide.

In another embodiment, the interface receiving the added at least one product or analog thereof denotes an electronic shopping cart being at least one of a user-specific cart; a generic cart associated with a user and/or acquaintances thereof; a generic cart associated with a group of television-viewers comprising the user.

In another embodiment, the method further comprises alerting a user through an electronic notification upon occurrence of the addition of the at least one product and/or analog thereof to the interface, the alerting comprising overlaying a currently displayed content with a visual identifier associated with salability of the at least one product.

In another embodiment, the method further comprises receiving a user input comprising at-least one of a voice command, an identifiable-face, an exhibited emotion, a gesture, a typed instruction; and identifying one or more products on the interface based on processing the received user-input.

A method of managing an interface of a device is provided. The method comprises receiving product-metadata and display-content, the product-metadata representing at least one product to be displayed as part of the display-content; and triggering addition, without user intervention, of the at least one product or an analog thereof related to the product-metadata in a mapped relationship with display-content, on an interface of a web-enabled application rendered on the display, wherein the display comprises a display-device or the computing-device.

In another embodiment, the interface comprises a web-based shopping-cart comprising the added at least one product and the web-enabled application comprises an e-commerce shopping application.

In another embodiment, the method comprises displaying the added at least one product within the interface along with information to cause depiction of the mapped relationship, the information being at least one of a channel, program information, a show-time, a genre, and a viewer.

In another embodiment, the mapped-relationship comprises depicting a relation among one or more parameters of the display-content and the added at least one product.

In another embodiment, the product-metadata comprises information related to at least one of a shopping-platform, a product code, and a product-URL.

In another embodiment, the adding comprises providing, by the shopping-platform, the metadata information to the shopping-application; and triggering an addition of the products to a cart of the shopping application.

In another embodiment, the receiving of the product-metadata comprises at least one of receiving product-metadata embedded within the display-content; and receiving the product-metadata and display-content from separate sources.

A method of managing an interface of a device is provided. The method comprises receiving at least one product-metadata and display content, the product-metadata representing at least one product to be displayed as part of the display-content; identifying a web-enabled service-provider based on the product-metadata; triggering, without user-intervention, addition of a product or an analog thereof related to the product-metadata, rendered at the display at an interface of the web-enabled service-provider, wherein the display comprises a display device or a computing device.

A method of managing an interface of a device is provided. The method comprises receiving at least one product-metadata and display-content, the product-metadata representing at least one product to be displayed as part of the display-content; identifying a web-enabled service provider based on the product-metadata; and triggering addition, without user intervention, of the at least one product or an analog thereof related to the product-metadata in a mapped relationship with the display-content, at an interface of the web-enabled service-provider rendered at the device, wherein the device comprises a display-device or a computing device.

A method of managing an interface of a device is provided. The method comprises receiving at least one product metadata and display content, said metadata representing at least one product to be displayed as a part of said content; and triggering addition of a product or an analog related to the product metadata, at an interface of a web-enabled service provider without user intervention, wherein said addition at-least partly comprises sending the product details to a content-manager of said service provider for updating said user's account maintained by said content-manager based on said metadata.

In another embodiment, the method further comprises receiving user-credentials during a user-login process for allowing the user to access said added products through a user-profile based on said web-enabled service provider.

A method of managing an interface of a device is provided. The method comprises receiving product-metadata and display-content, the product-metadata representing at least one product to be displayed as part of the display-content; and triggering addition, without user intervention, of the at least one product or an analog thereof related to the product-metadata at an interface provided at the device, wherein the device comprises a display-device and/or a computing-device; and receiving a user selection of one or more of the added at least one product from the interface and enabling access to the selected products from one or more web-enabled service providers.

A device for managing an interface is provided. The device comprises a receiver configured to receive product-metadata and display-content, the product-metadata representing at least one product to be displayed as part of the display-content; and a processor configured to enable an automatic addition, without user intervention, of the at least on product or an analog thereof related to the product-metadata at an interface provided at the device, wherein the device comprises a display-device and/or a computing-device.

In another embodiment, the device further comprises a processor configured to fetch relevant information about the at least one product from an external-source for causing a display of details on the interface alongside the added at least one product.

In another embodiment, the device further comprises a display configured to display the added at least one product or analog thereof in a mapped state with one or more parameters of the display-content; and an alert module configured to electronically notify a user of occurrence of the addition of the at least one product and/or analog thereof on the interface.

In another embodiment, the device further comprises a facilitating module configured to facilitate a access of a user to the added at least one product or analog thereof through the interface from an electronic program guide or an equivalent interactive program guide as associated with the display content.

A device for managing an interface is provided. The device comprises a display; a receiver configured to receive product-metadata and content, the product-metadata representing at least one product to be displayed as part of the content on the display; and a processor configured to trigger addition, without user-intervention, of the at least one product or an analog thereof related to the product-metadata in a mapped relationship with the content at an interface of a web-enabled application rendered at the device, wherein the device comprises a display-device and/or the computing-device.

In another embodiment, the interface rendered by the processor is a web-based shopping-cart comprising the added products and the application is an e-commerce shopping application.

A device for managing an interface of a device is provided. The device comprises a receiver configured to receive at least one product-metadata and content, the product-metadata representing at least one product to be displayed as part of the content; a processor configured to identify a web-enabled service-provider based on the product-metadata; and to trigger addition, without user-intervention, of the at least one product or an analog thereof related to the product-metadata, rendered at the device on an interface of the web-enabled service-provider, wherein the device comprise a display-device and/or a computing device.

A device for managing an interface is provided. The device comprises a receiver configured to receive at least one product-metadata and display-content, the product-metadata representing at least one product to be displayed as part of the display-content; a processor configured to identify a web-enabled service provider based on the product-metadata; and to trigger, without user intervention, addition of the at least on product or an analog thereof related to the product-metadata in a mapped relationship with the display-content, on an interface of the service-provider rendered at the device, wherein the device comprises a display-device and/or the computing-device.

A device for managing an interface is provided. The device comprises a receiver configured to receive at least one product-metadata and display-content, the product-metadata representing at least one product to be displayed as part of the display-content; and a processor configured to trigger addition, without user intervention, of the at least on product or an analog thereof related to the product metadata on an interface of a web-enabled service provider and to send details pertaining to the product-metadata to a content-manager of the web-enabled service provider for updating a user's account maintained by a content-manager based on the product-metadata.

A device for managing an interface of the device is provided. The device comprises a receiver configured to receive product-metadata and display-content, the product-metadata representing at least one product to be displayed as part of content; and a processor configured to trigger automatic addition, without a user-intervention, of the at least one product or an analog thereof related to the product-metadata at an interface provided at the display, wherein the display comprises a display-device and/or a computing-device; and the processor is further configured to allow a user to select one or more of added at least one product from the interface and to enable access to the selected products from one or more web-enabled service providers.

FIG. 1 illustrates a method of managing (adding products on) an interface of a device in accordance with an embodiment of the disclosure. The method comprises receiving (operation 102) product-metadata along with display-content, wherein the product-metadata represents at least one product to be displayed as part of the display-content. The display-content may be, but is not limited to, a television broadcast (terrestrial), a satellite broadcast, or a broadcast through IPTV (Internet protocol television). The product-metadata may be received either from a source of the display-content (i.e., embedded within the display-content) or from a source different from that of the display-content (i.e., from a cloud-storage or an external server). Such sources of the display content and/or product-metadata may be accessible wirelessly or through a wired connection. The product-metadata pertains to products equivalent to or similar to products present in the display-content, and may, in turn, be electronic-data associated with various items or products in the display-content. The product-metadata may be one or more of a QR code, watermarking, or a data-representation encoded in a predetermined format (e.g., a numerical code), a web-URL, a product code, and a product category.

Further, the method comprises controlling to add automatically (operation 104)—without user intervention—the at least one product or an analog thereof related to the product-metadata at an interface provided on a display-device and/or a computing-device. The interface may be an electronic graphical user interface capable of displaying the added product along with corresponding details. In an embodiment, the interface may be an electronic shopping cart such as a user-specific cart, a generic cart (e.g., a family cart) associated with a user and/or acquaintances thereof, a generic cart associated with a group of television-viewers comprising the user, and so on. The user-specific cart may be an electronic cart specified or authorized based on a user password or user identification.

The product and/or the analog thereof are automatically added to the interface based on the extraction of items from the broadcast, as later discussed during the disclosure. Further, the at least one product and/or the analog thereof are added based on at least one setting configured by the user as part of user-driven control to add the desired products. Such configurable-setting pertains to at least one category of the at least one product and at least one feature of the least one product comprising at least one of a type, color, a reward-on-purchase; at least one television-program; one or more user-profiles; and at least one television channel. For such purpose, the product-metadata as received is filtered based on aforesaid user-defined parameters (configurable-settings by the user) of the display-content. Thereafter, the filtered product-metadata is stored to cause the automatically adding products based on the setting configured by the user.

The adding further comprises fetching relevant product information (e.g., price, product details, expiry date, model number, manufacturer, brand name, etc.) about the product from an external source (e.g., the Internet, a remotely located server) based on the filtered product-metadata for displaying the relevant product information alongside the added products. Further, the adding comprises annotating the added product as being shown in the display content (i.e., ongoing television broadcast) with an identifier. In an example, a currently displayed content may be overlaid with a visual identifier associated with salability (e.g., availability-for-sale) of the products. Thereafter, an alert-notification as an electronic-notification is electronically communicated to the user with respect to addition of each of the added products/their analogs into the interface. The notification may be communicated through either the display cum computing device (i.e., television, mobile-phone, tablet, etc.) or a display device (e.g., a smart-watch etc).

The method further comprises receiving a user-input comprising at least one of a voice command, an identifiable-face, an exhibited emotion, a gesture, a typed instruction. Based on processing of the received user input, one or more products are identified within the interface whereon the added products are displayed. As a result, less or shortlisted products get depicted at the interface, thereby providing an ease of selection of the products from the interface.

Figure 2:
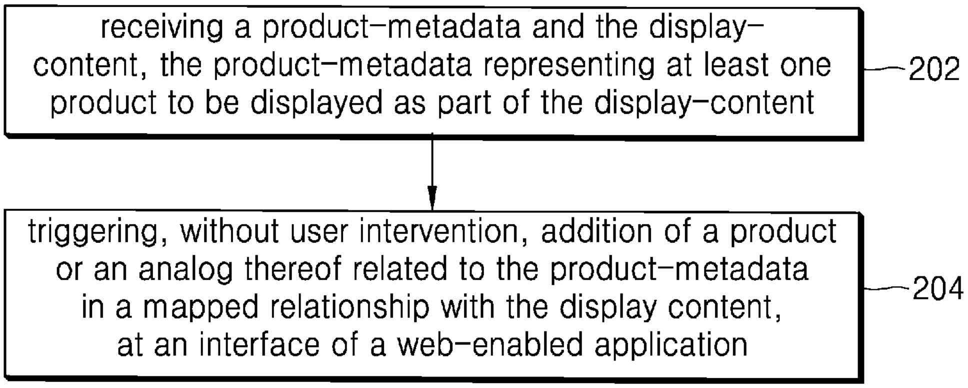
FIG. 2 illustrates another method of adding products at an interface of a device, in accordance with another embodiment of the disclosure.

FIG. 2 illustrates another method of adding products at an interface of a device, in accordance with another embodiment of the disclosure. The method comprises an operation 202 that corresponds to the operation 102 as described above. The product-metadata comprises information related to at least one of a shopping platform, a product code such as QR code, barcode or any kind of code used for identifying the product, and a product URL which is used to link to a website showing any kind of information about the added products. The product-metadata as received may be either embedded within the display-content or the product-metadata and display-content may be received from separate sources.

The method comprises further triggering (operation 204) addition of the product or an analog thereof related to the product-metadata in a mapped relationship with the display-content. The triggering takes place at an interface of a web-enabled application rendered at the display-device and/or the computing-device, without user intervention. While the interface may be a web-based electronic shopping-cart comprising the added products, the application leading to said interface may be an e-commerce shopping application. Accordingly, in an example, the adding includes providing the product-metadata information by the shopping-platform to the shopping-application in order to trigger the addition of the products into the 'cart' of the shopping application.

Further, the mapped-relationship denotes a relation among one or more parameters (e.g., a broadcasting channel name, broadcasting program information, broadcasting program show-time, broadcasting genre, and a viewer) of the display-content and the added products. For example, the one or more added products may be shown as being related to a 'television-program title', a tele-serial name, a thumbnail-impression of the display-content comprising the product, etc.

Figure 3:
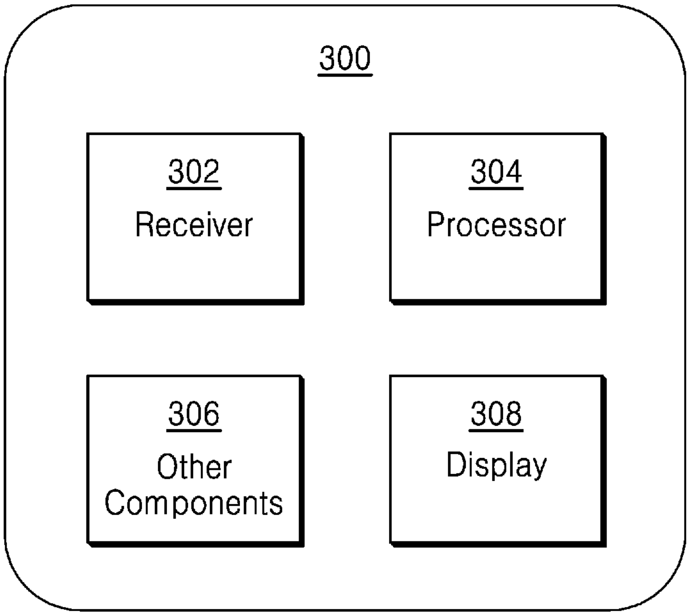
FIG. 3 illustrates a block diagram of a device 300 in accordance with an embodiment of the disclosure.

FIG. 3 illustrates a block diagram of a device 300 in accordance with an embodiment of the disclosure. The device 300 may include a receiver 302 that performs the operations 102, 202 and a processor 304 that performs the operations 104, 204. The device may include a display 308 to display the operations of adding the products at the interface of the device. Likewise, there may be other components 306 within the device 300 that facilitate the operational interconnection between the components 302 to 304 and perform other ancillary-functions.

Figure 4:
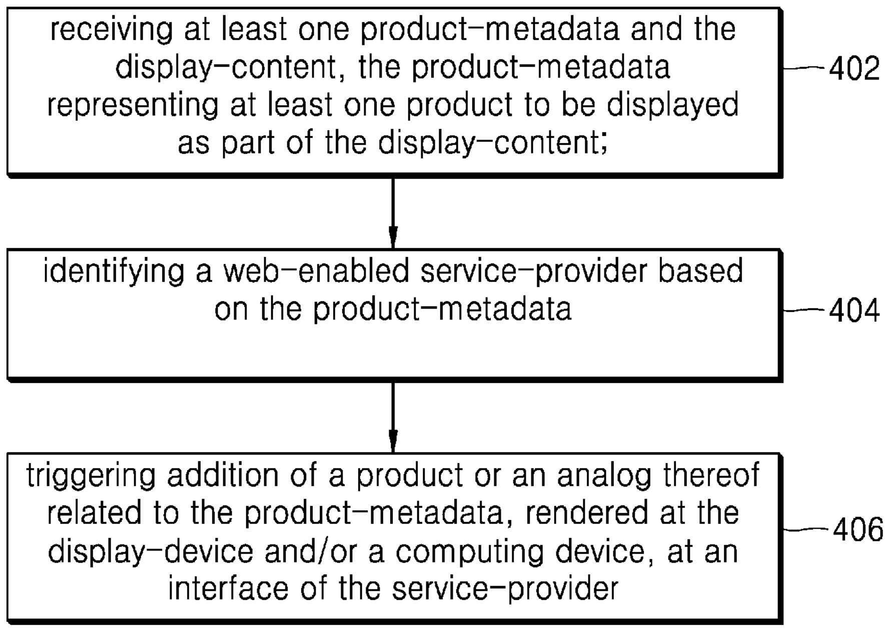
FIG. 4 illustrates a method of adding products at an interface of a device in accordance with an embodiment of the disclosure.

In a further embodiment of the disclosure, FIG. 4 illustrates a method of adding products at an interface of a device. The method of FIG. 4 comprises operation 402, which corresponds to operations 102 and 202.

Further, the method comprises identifying (operation 404) a web-enabled service-provider based on the product-metadata. In an embodiment, the web-enabled service provider may be an Internet-based service provider depicting the availability of products/services for further transactions, such as exhibition, sale, hypothecation, hiring, etc.

Further, the method comprises triggering, without user-intervention, addition (operation 406) of a product or an analog related to the product-metadata, rendered at the display-device and/or a computing device, at an interface of the identified service-provider. While the product-metadata is rendered and dealt with at the display device as part of display-content, the interface at the identified service-provider may be a graphical user interface as rendered on the website of the online service provider to exhibit the products for further transactions.

Further, in an implementation, the addition of the products in the operation 406 may further include a depiction of the display-content details alongside the added products on the interface, as earlier mentioned with respect to the operation 204.

Figure 5:
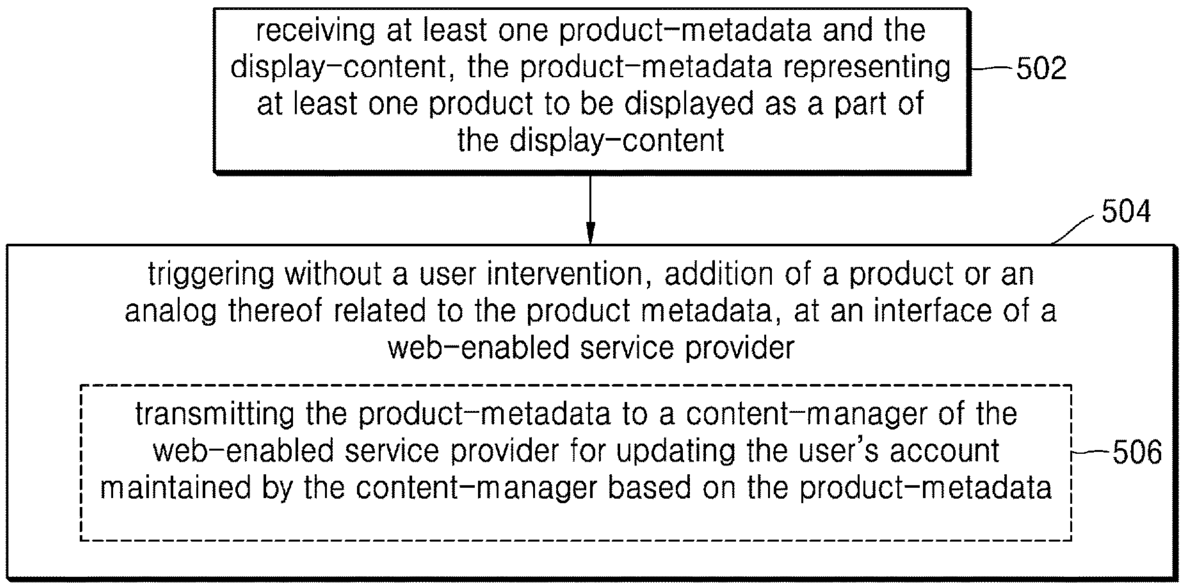
FIG. 5 illustrates a method of managing (adding products on) an interface of a device in accordance with an embodiment of the disclosure.

In accordance with a further embodiment of the disclosure, FIG. 5 illustrates a method of managing (adding products on) an interface of a device. The method comprises operations 502 and 504 that are analogous to the operations 202 and 204 of FIG. 2.

The operation 506 at least partly constitutes the operation 504 and accordingly may be treated as a sub-operation with respect to the operation 504. It denotes sending or transmitting (operation 506) the product details to a web-content manager of the service provider for updating the user's account maintained by the content-manager based on the product-metadata. The web content manager may be any entity authorized for adding same or analogous product based on the received metadata to user account/cart, through the corresponding service-provider website. More specifically, the profile or subscription-account of the user as maintained by the service provider now includes the "products" as having been added into a 'personalized-interface' (i.e., an electronic shopping cart) as rendered with respect to the user by the service provider.

In another embodiment, the method further comprises receiving user-credential during a user-login process for allowing the user to access the added products through the user-profile based on the web-enabled service provider, wherein the user-profile relates to the user-subscription and is used to render the personalized interface.

Figure 6:
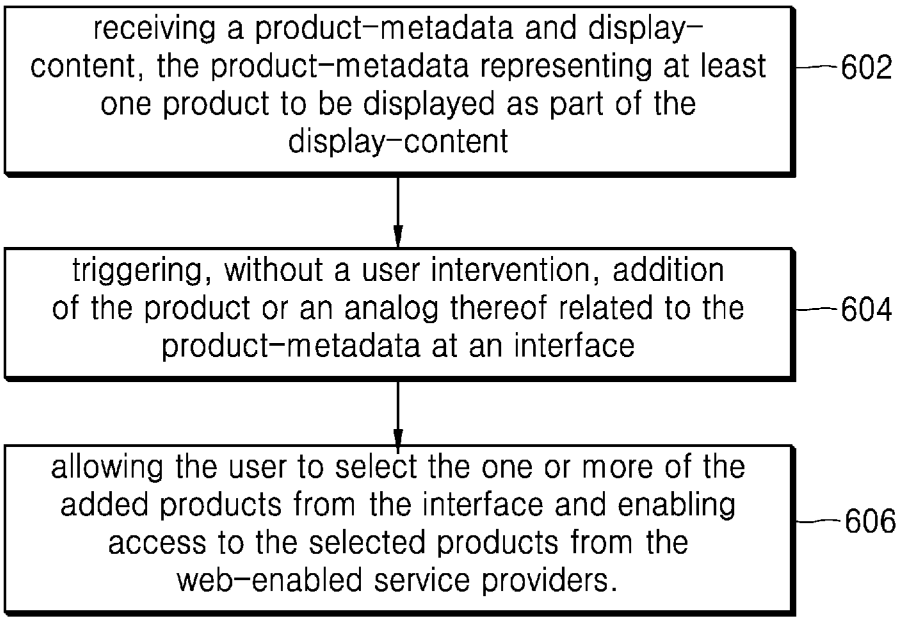
FIG. 6 illustrates a method for addition of products at an interface of a device in accordance with an embodiment of the disclosure.

In accordance with an embodiment of the disclosure, FIG. 6 illustrates a method for addition of products at an interface of a device. The method operations 602 and 604 correspond to the method operations 102 and 104 in FIG. 1.

The method further comprises allowing (operation 606) the user to select the one or more of added products from the interface and enables access to the selected products from one or more web-enabled service providers. More specifically, the products as having been automatically added to the interface based on preceding operations may be rendered accessible to the user from the interface itself, through one or more hyperlinks or any other identifier associated with the web-based service provider. The hyperlink/identifier may be located within the interface and alongside the added product with which it is associated.

Figure 7:
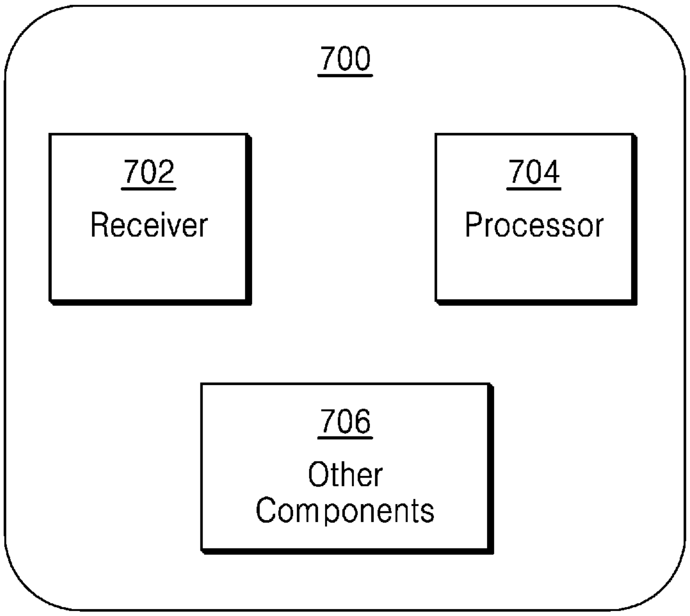
FIG. 7 illustrates a block diagram of the device according to an embodiment of the disclosure.

FIG. 7 illustrates a block diagram of the device according to an embodiment of the disclosure. The device 700 may include a receiver 702 that performs the operation 402, 502, 602 and a processor 704 that performs the operation 406, 504, 506 and 604. Likewise, there may be other components 706 within the device 700 that facilitates the operational interconnection between the components 702 and 704 and execute the operations 404, and 606, and perform other ancillary-functions.

Figure 8:
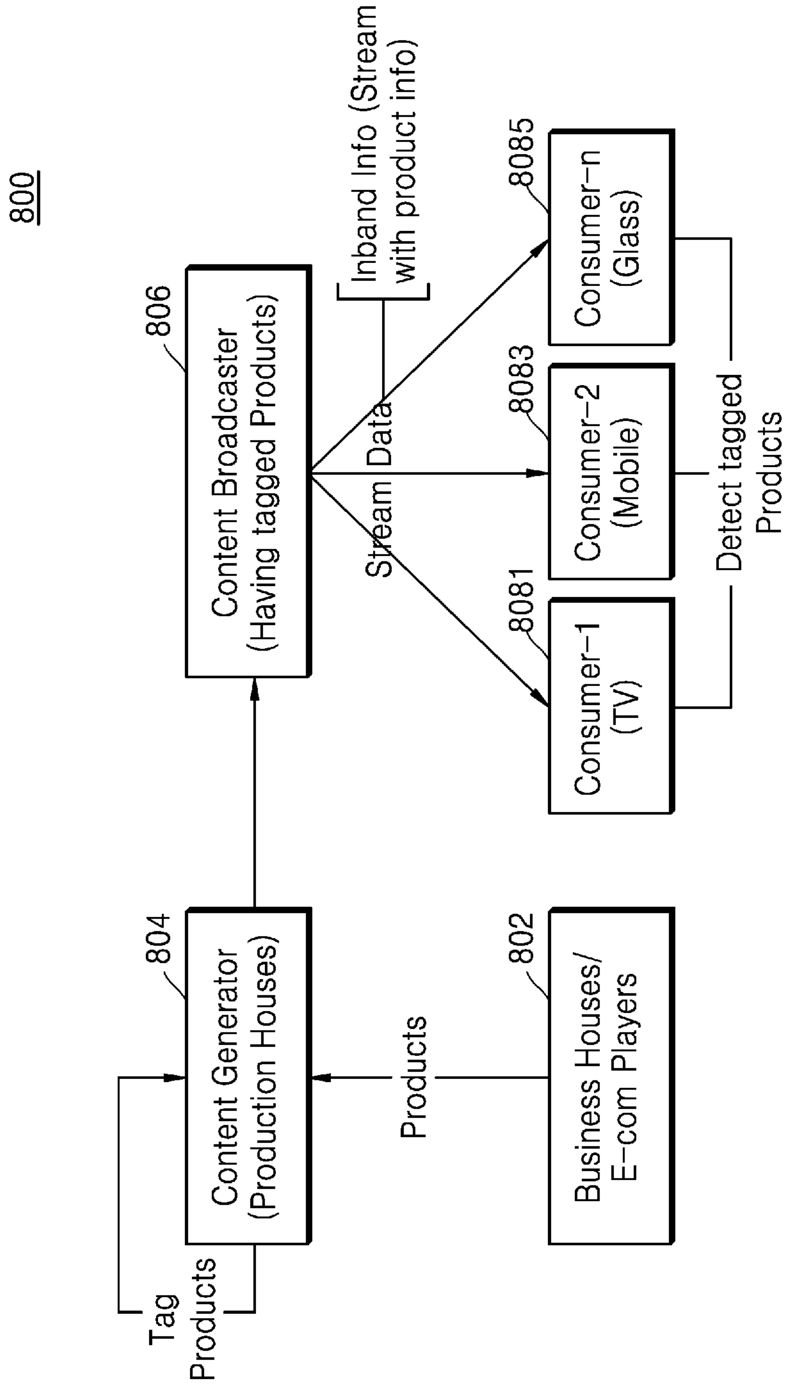
FIG. 8 illustrates exemplary operations in accordance with an embodiment of the disclosure.

FIG. 8 illustrates exemplary operations in accordance with an embodiment of the disclosure. More specifically, the networking environment 800 as depicted in FIG. 8 corresponds to the device of FIG. 3 and FIG. 7 and its interaction with other elements within the environment 800.

The networking environment 800 may include a business-house 802 denoting the product-sellers. In an example, business houses include the e-commerce players such as Amazon, Alibaba, ebay, etc. A content generator 804 may be a production-house and generates the actual contents for broadcasting content live or deferred live, such as television programs for the end-user viewership. A content broadcaster 806 may be a satellite/terrestrial television broadcaster (e.g. Dish TV, airtel etc) or an internet-protocol based (IP) based television broadcaster. The consumers 8081, 8083, and 8085 may denote end-users provided with the display-device or the computing devices for viewing the television broadcast and observing the products of the business houses as forming a part of the television broadcast.

In operation, the business houses/E-com-players 802 and the production houses 804 collaborate to showcase the targeted products to the users through various TV shows. The products are tagged within the media content/frames to be broadcast. The tagging could be done using various mechanism such as QR coding, Digital watermarking etc. Upon having been tagged, the content with the tagged products is broadcast through content-broadcaster 806 for rendering at the consumers' end 808. The content reaches the consumers' devices 808 through satellite, terrestrial or internet-protocol based network. Now, as the consumer watches the broadcast through the consumer's display or computing device 808, a device 300, 700 forming a part of the device 808 detects the tagged products. The device 300, 700 adds these products to a graphical user interface (i.e., an electronic cart) or a user-wish cart (i.e., a shopping-cart) without user intervention and without disturbing other viewers.

Accordingly, the user or consumer through his/her device 808 is facilitated to check the electronic-cart during or after the currently running program and can observe or buy products as per his/her preference. Further, as mentioned before, the device at the user's end may be either a display device (e.g. television) or a computing-device (like a mobile device or a smart-watch).

Figure 9:
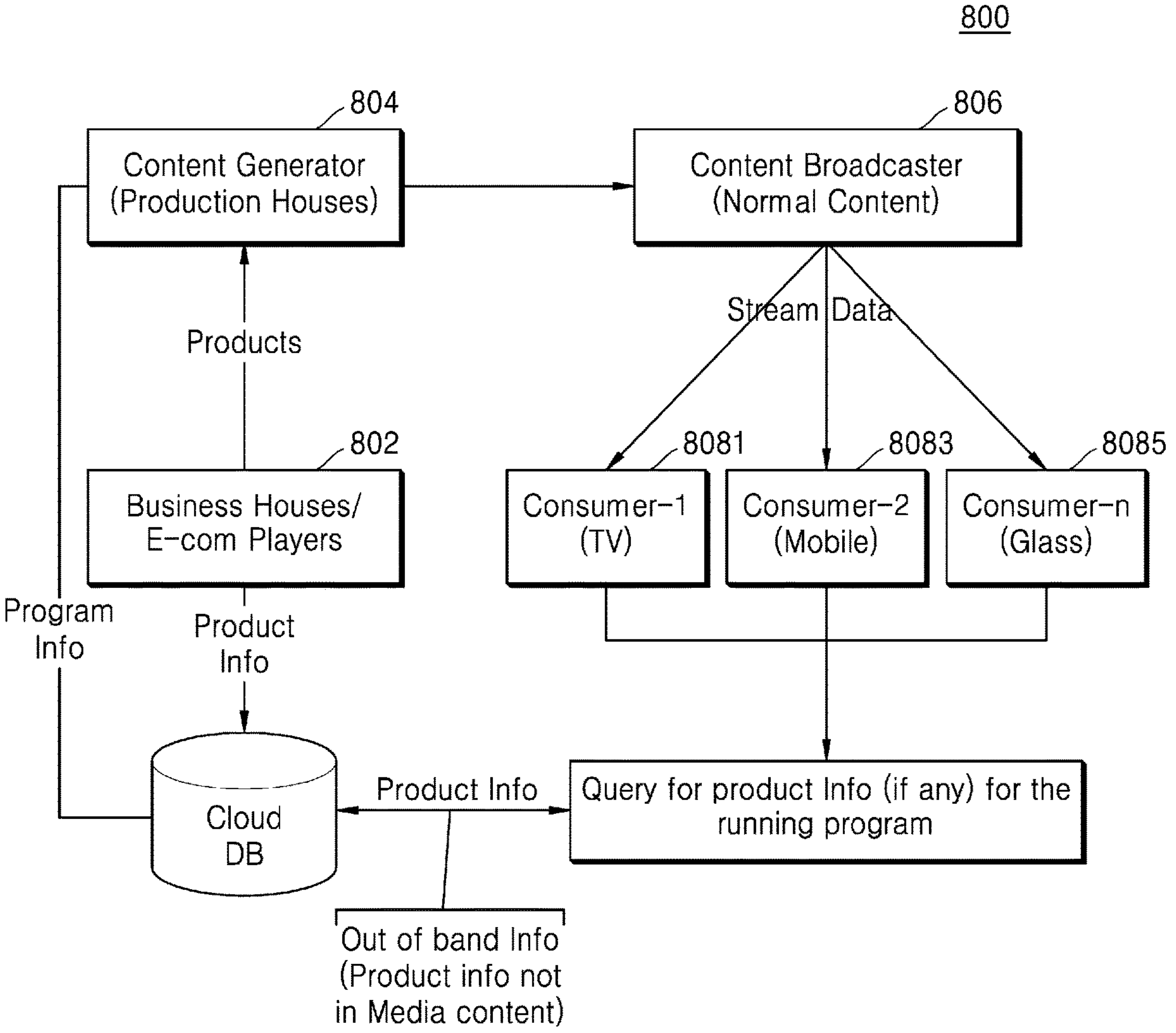
FIG. 9 illustrates exemplary operations in accordance with another embodiment of the disclosure.

FIG. 9 illustrates exemplary operations in accordance with another embodiment of the disclosure. Unlike FIG. 8, in FIG. 9, the product-metadata is not embedded in the television broadcast and not extractable therefrom. In other words, the product-metadata is not received alongside or as a part of the television broadcast, and needs to be fetched externally from a source different than the display-content. Instead, the information regarding products mapping with the associated media content may be saved separately on a cloud database 900 by the business-house 802 and the content generator 804. The device 300, 700 implemented within the computing-device of the consumer, upon having received the television broadcast, queries the cloud database 900 to check if there are any products associated with the current TV content. If found, then the device 300, 700 adds these products to the electronic-cart.

Once the products have been added to the electronic interface both in FIG. 8 and FIG. 9, the user can check the shopping cart (during or after the currently running program) and observe/buy the added products as per his/her preference.

Figure 10A:
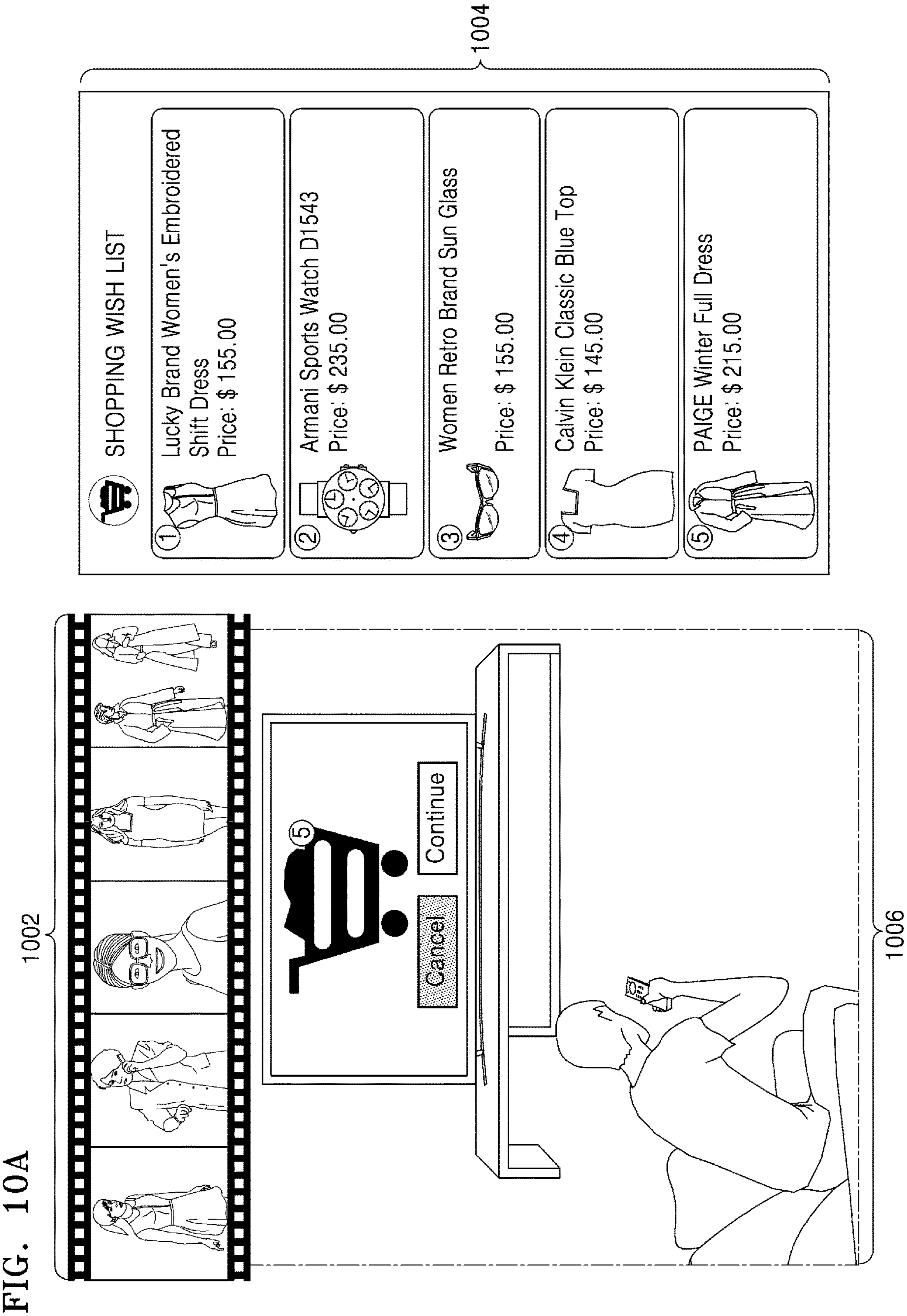
FIG. 10A and FIG. 10B illustrate an addition of products in a graphical user interface as exemplary embodiments in accordance with the disclosure.
Figure 10B:
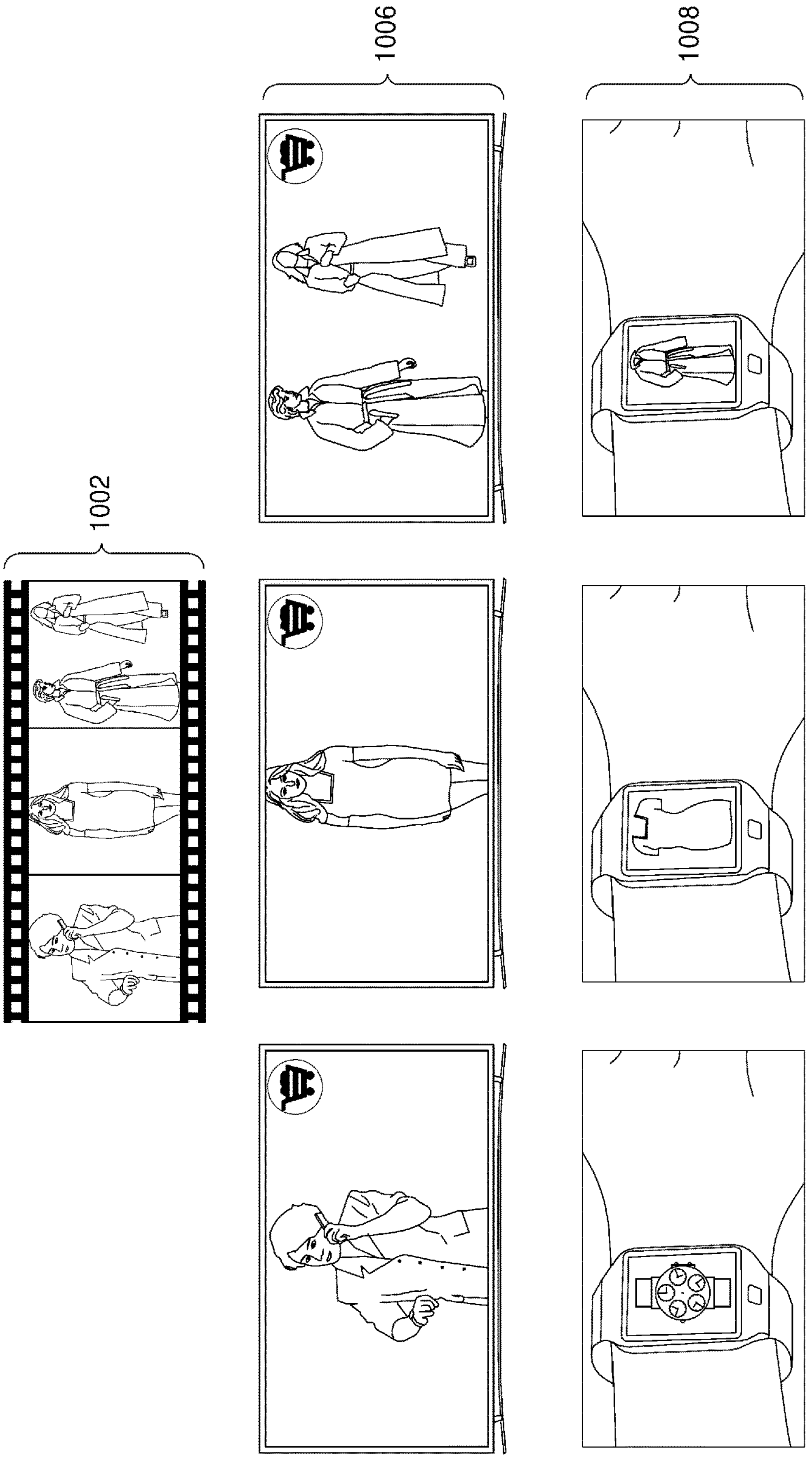

FIG. 10A and FIG. 10B illustrate an addition of products in a graphical user interface as exemplary embodiments in accordance with the disclosure. The television broadcast is represented by 1002 and the added products in the graphical user interface are depicted by 1004.

Further, the user receives alerts in terms of the automatically happened addition of products through the computing or display-devices (like smartphone, smart-watches, virtual-reality headgear as connected to the device 300, 700). The alert-notification may be referred as 1006, wherein the notification may depict the number of added products.

Accordingly, after having watched the content, the user may have a look at the added and listed item from electronic interface/cart and directly purchase them from either the electronic interface, which may itself act as an aggregator of different e-commerce sites or as a centralized system for accessing different e-commerce sites. Accordingly, the user is allowed to buy an exactor equivalent product as shown in a live program/show/movie, which may be a broadcast from a satellite, terrestrial or IP network.

Further, as illustrated in FIG. 10B, the alert-notification 1006 for an addition of the products to the interface during the reception of the television broadcast 1002 may take other exemplary forms, such as flashing an identifier within the television screen as and when the product present within the television broadcast is added. More specifically, the display of the product as a part of the television broadcast leads to a display of an identifier as well, thereby indicating 'the then' performed addition of product.

Likewise, the alert notification may also take up a form as depicted through 1008, wherein the added product is depicted in actual (without being a part of the television broadcast) at a display device (say a smart-watch) alongside an identifier depicting the addition of the product into the interface. The notification as depicted by 1008 may be useful when the user is not actually viewing the broadcast but wishes that not only the product be added, but also an alert to that effect may be received.

Figure 11:
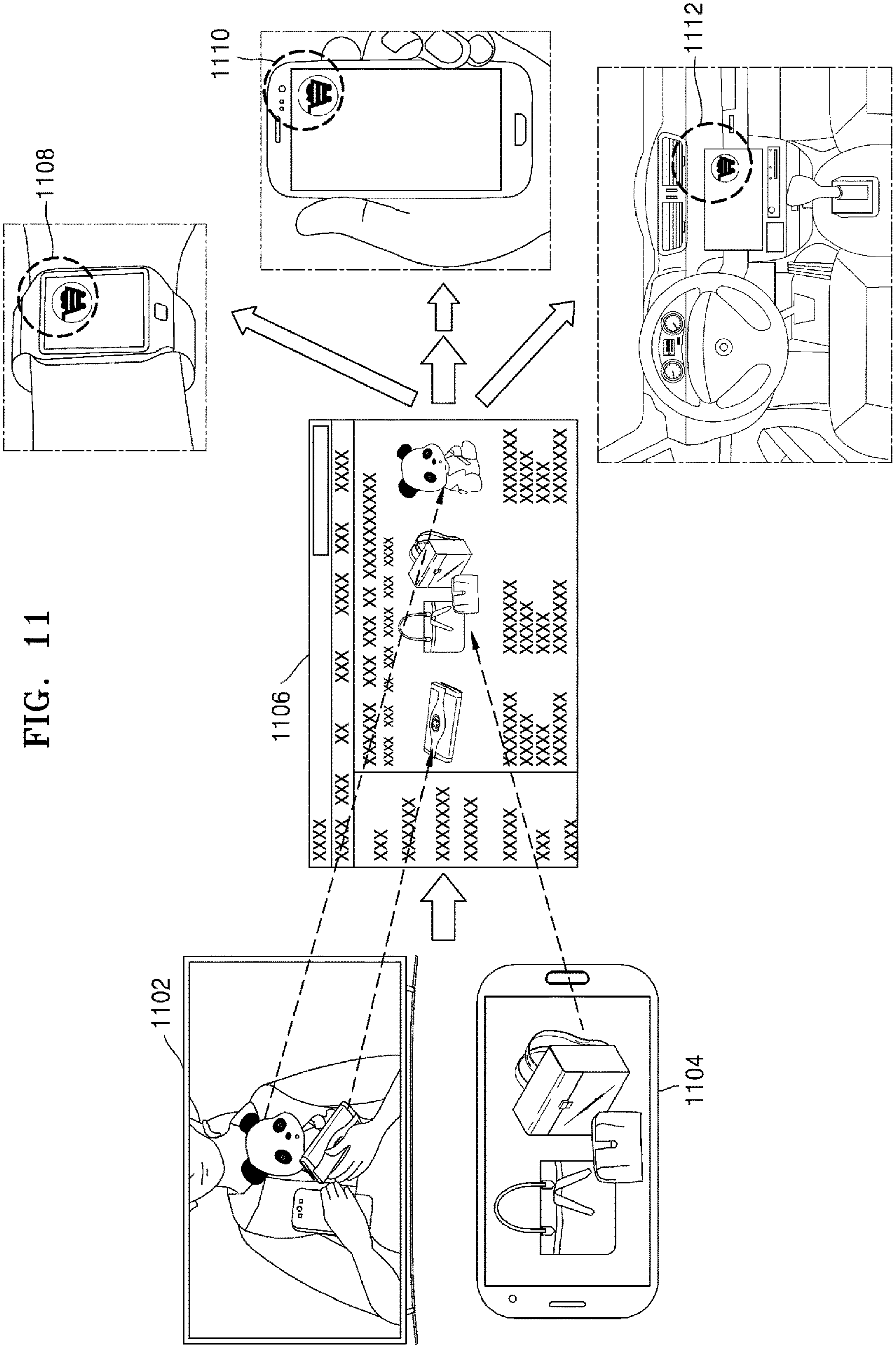
FIG. 11 illustrates a way of notifying the user about the added products as an exemplary embodiment in accordance with the disclosure.

FIG. 11 illustrates a way of notifying the user about the added products as an exemplary embodiment in accordance with the disclosure. As shown FIG. 11, within the computing-devices 1102, 1104, an indication may be shown against the products rendered in the television broadcast. The indication may identify the products within the broadcast as available for purchase. Further, the indicated products are added to the interface 1106 while the television broadcast is being rendered. Further, a notification may also be sent regarding the addition of products to the auxiliary device such as a smart-watch 1108, a display device 1110, or a display device implemented on a vehicle 1112, which may be remotely located. The notification is useful especially when the user is not viewing the television broadcast.

In an embodiment, the broadcast content may be decoded and played at a television, mobile-phones supporting multimedia content, personal-computers, virtual-reality devices etc. Accordingly, the devices 1102, 1104, 1110 and 1112 (excluding the smart-watch) may be referred to as computing display devices. The devices merely depicting the notification about an addition of products (e.g., the smart-watch) and not adapted to render the television broadcast may be termed as display-devices. Accordingly, while reference numerals 1102, 1104, 1110 and 1112 (e.g., a mobile-phone, car-dashboard screen) refer to computing display-devices, the smart-watch also referred by reference numerals 1108 refers to a display-device only.

Figure 12:
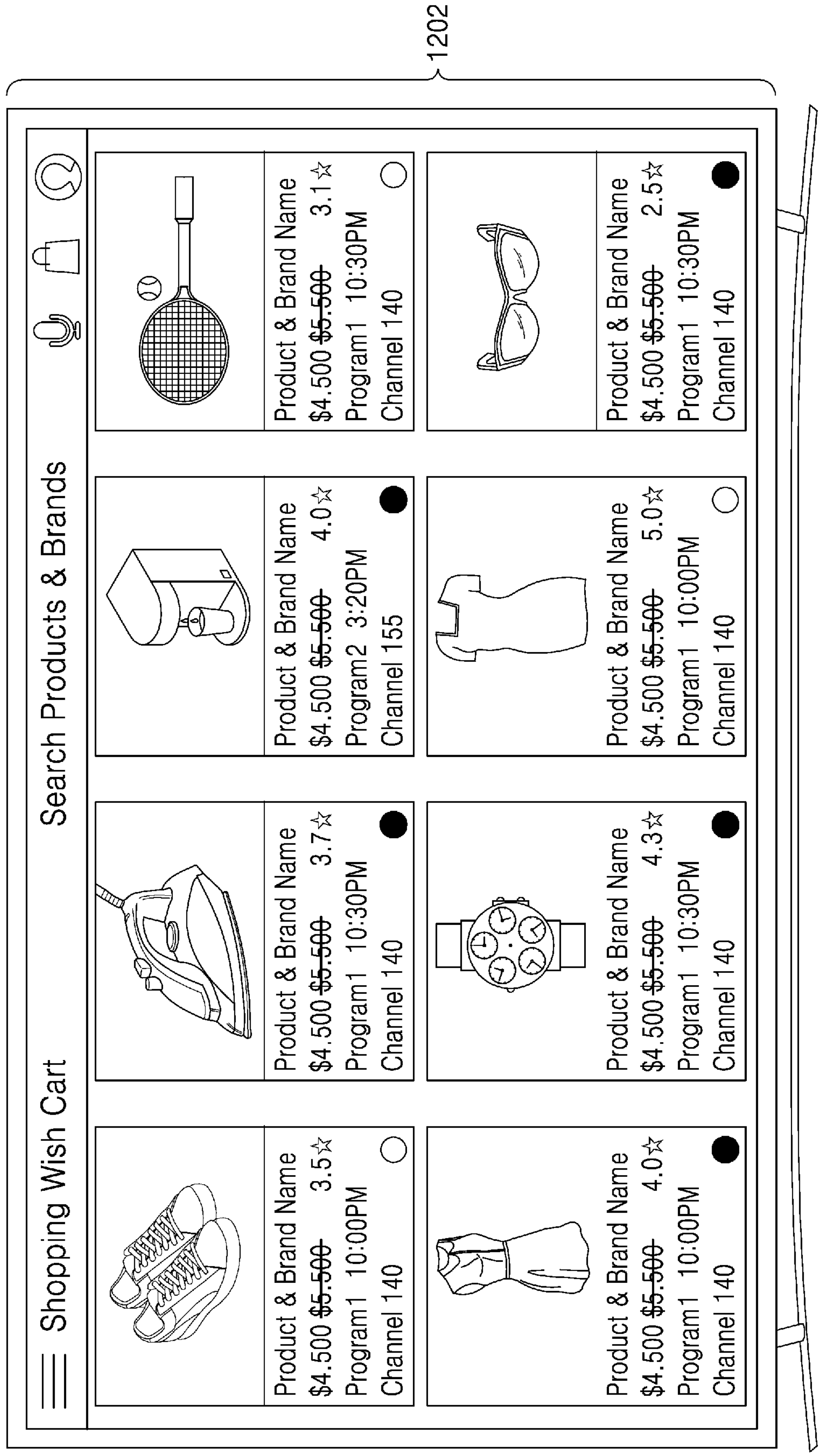
FIG. 12 illustrates a user interface as an exemplary embodiment in accordance with the disclosure.

FIG. 12 illustrates a user interface as an exemplary embodiment in accordance with the disclosure. FIG. 12 shows a view of the user interface 1004 as depicted in FIG. 10. More specifically, as shown in FIG. 12, each product, e.g., 1202, is depicted at the interface along with details pertaining to the product (e.g., a price, a rating, etc.) and the corresponding broadcast program-details (e.g., a television program title, a channel-title, etc.)

FIG. 13 illustrates an electronic interface in accordance with an exemplary embodiment of the disclosure. In FIG. 13, the electronic interface showing the added products is depicted in another format, e.g., a two-dimensional array. As shown in FIG. 13, the interface may be bifurcated into three columns, 'channel' 1302, 'programs' 1304 and 'products' 1306. Accordingly, the product details as depicted in FIG. 13 may be distributed across columns, such that the product details pertaining to particular-products are depicted in the same row. Accordingly, irrespective of the nature or type of products, the products belonging to same television program or channel may be clubbed together in the same row. Further, the present interface as depicted in FIG. 13 may also be understood as a specific form of an electronic program guide (EPG) which may be used to not only scan through the present broadcast program or future-programs for broadcast but also to access the products with respect to earlier broadcast programs.

Figure 14:
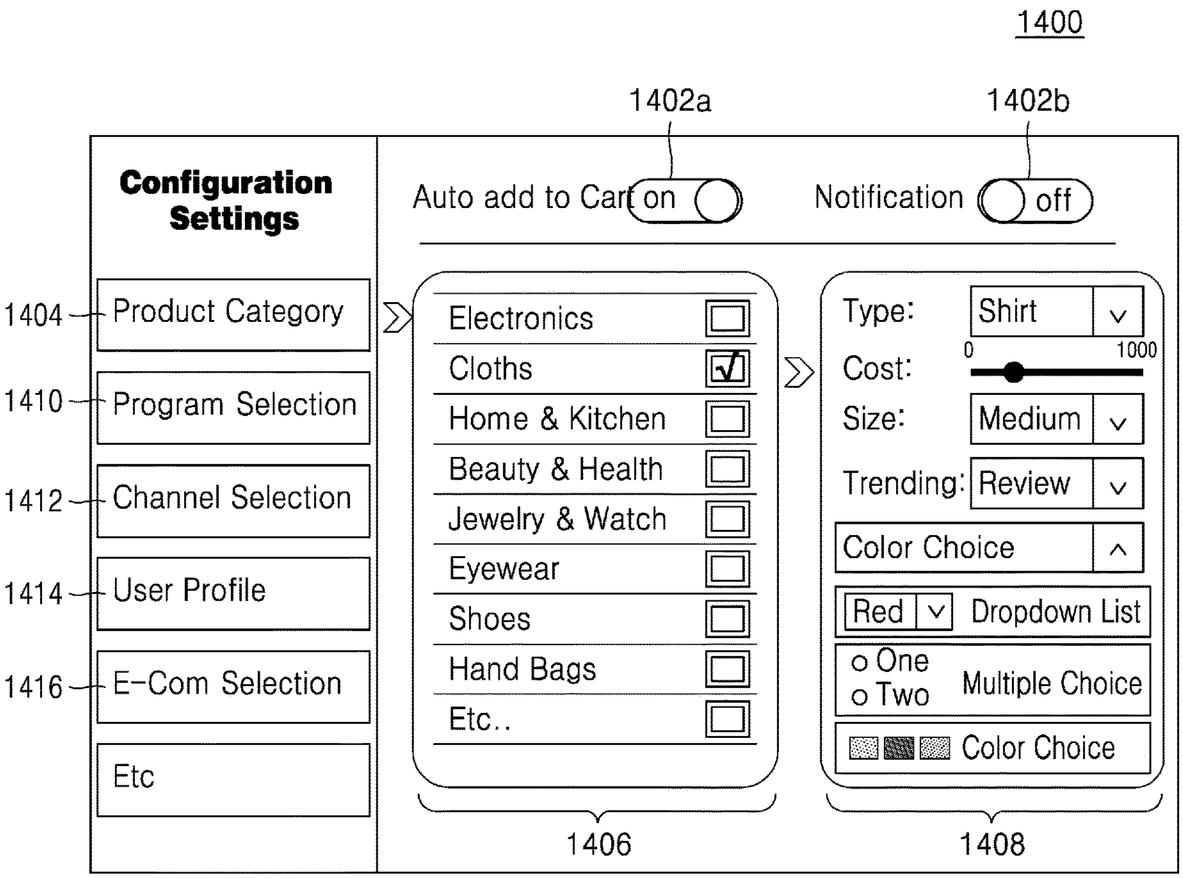
FIG. 14 illustrates a user interface 1400 in accordance with an exemplary embodiment of the disclosure.

FIG. 14 illustrates a user interface 1400 in accordance with an exemplary embodiment of the disclosure. More specifically, the user interface 1400 depicted in FIG. 14 allows a user to selectively allow the addition of products or equivalents (i.e., analogous products) to the user interface based on the television broadcast characteristics and/or the product characteristics, thereby personalizing the contents added into the cart through the user-control.

The user interface 1400 allows the user to enable or disable the addition of products to the electronic interface through an option 1402*a*. Likewise, an option 1402*b* may be provided to disable the notification.

Further, the user interface 1400 allows the user to set a 'Product Category' 1404 as 'product-filter' (i.e. criteria to shortlist products) based on various product-characteristics such as 'Electronics', 'Clothes', 'Home and Kitchen', 'Beauty and Health' etc. as represented in the exemplary column 1406. Further, upon selection of particular category such as 'Clothes', various sub-characteristics or sub-product filter may be outlined through the column 1408 such as 'Type' 'Cost', Gender', 'Color', 'Cost', 'Trending'. Accordingly, selection of product-characteristics or the combination with sub-characteristics as the product-filter leads to a selection of particular products.

The column 1408, which may be referred as a sub-product filter, enables the user to exercise sufficient control over the type and kind of products to be added into the interface, thereby allowing the user to contemplate an addition of products of certain category only. In addition, the user may be also allowed to incorporate various control options (such as a drop-down box, radio-buttons etc.) within the interface to filter products based on individual colors or combination of colors from the interface. Likewise, other criteria are also conceivable to shortlist products from the interface.

Further, the interface 1400 as depicted in FIG. 14 allows the user to set a 'Program Selection' 1410 as 'program based filters'. This allows a user to select a particular program from which products are to be auto-captured and 'added' to the shopping cart. This can be 'time-based' program selection or genre-based selection.

Further, the interface 1400 allows the user to set a 'Channel Selection' 1412 as 'channel based filters'. This allows a user to select a particular television-channel from which products are to be auto-captured into the electronic cart.

Further, the interface 1400 allows the user to set a 'User Profile' as 'View-by-user' based filter 1414. A user specific-setting and corresponding product-addition into the electronic-cart is depicted as part of user-profile. Moreover, a particular user can share configuration settings with another user as well as product-added into the cart, thereby enabling similar product-addition to other user's cart directly.

Further, the interface 1400 allows the user to set E-Com Selection 1416 as 'E-commerce' partner based filter. Through the E-commerce partner based filter, the user may depict the preferences towards the aggregator from whom the products are desired to be bought. The user may also have options to set & store 'e-com-partner credentials' so that the shopping experience is seamless. Further, such credentials may also be borrowed from other auxiliary devices connected to the device 300, 700, if the user accessed the services of e-com-partner from other devices as connected to the system.

Further, the user interface 1400 may be understood to cover other analogous configuration-settings pertaining to the selective product addition.

Figure 15:
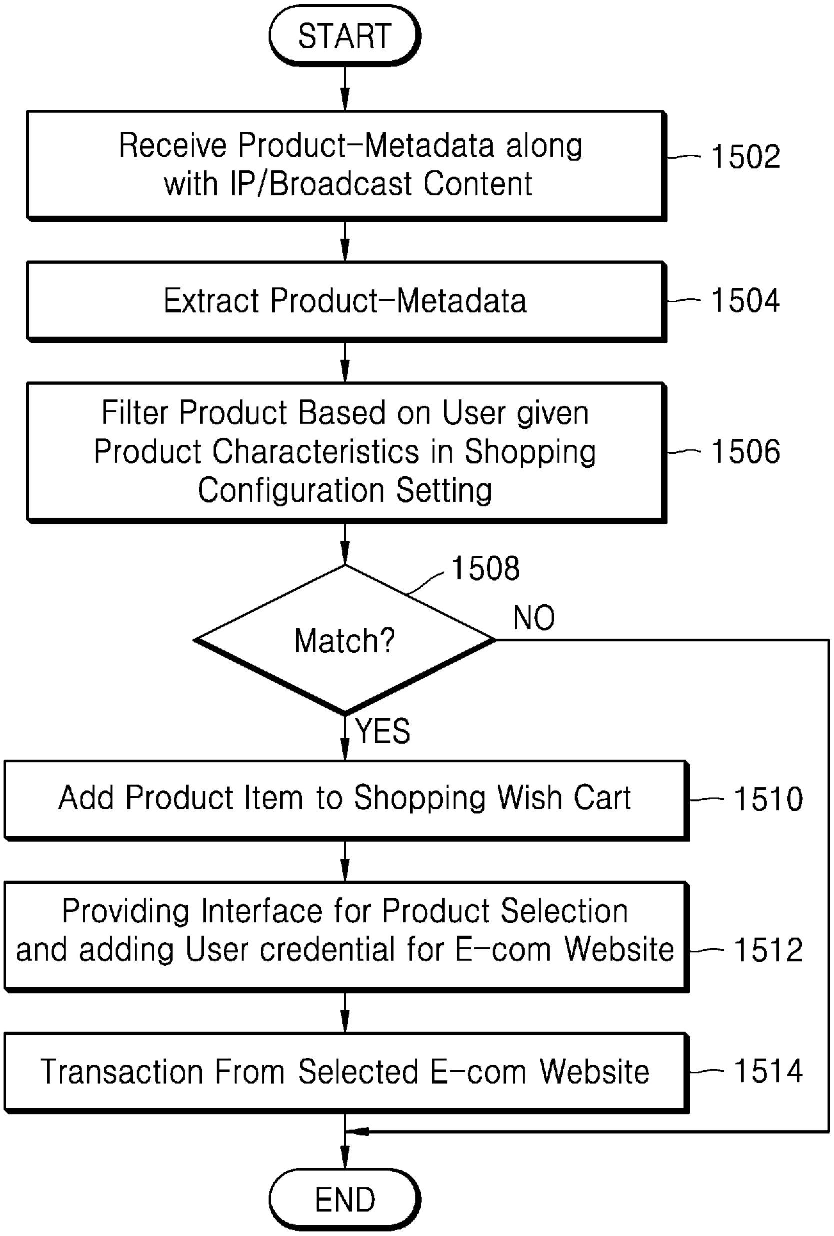
FIG. 15 illustrates a flowchart of a method performing operations in accordance with the embodiment of the disclosure.

FIG. 15 illustrates a flowchart of a method of performing operations in accordance with the embodiment of the disclosure.

In operation 1502, the broadcast (through satellite, terrestrial network or Internet Protocol) is received. As stated before, the products in the broadcast may be tagged for identification and for resulting in the addition of the products into the user interface. In addition, product-metadata may be optionally present within the broadcast.

In operation 1504, the product-metadata related to the product is extracted from the broadcast. In case the product-metadata is not embedded within the broadcast, then the product-metadata is fetched externally from a cloud database as depicted in FIG. 9.

The operations 1502 and 1504 may correspond to the method operations 102, 202, 402, 502 and 602.

In operation 1506, the products within the broadcast are considered for capturing based on the configuration settings (if any) as having been set by the user in accordance with the description of FIG. 14.

In operation 1508, in case the criteria as posed by the configuration-settings is met, the control flow proceeds to operation 1510 to shortlist a product under consideration for addition.

However, in the absence of such configuration settings, all of the products are captured in the current broadcast for addition. In other words, the products captured in operation 1506 hold applicable for every tagged product in the broadcast. Likewise, 1508 does not hold applicable in such a scenario.

In operation 1510, the captured-products are added to an electronic interface or electronic cart as rendered by the device 300, 700 within the computing device or display device at the user-end. Such addition may be accompanied with the details pertaining to the added product and details of the corresponding broadcast (television channel, serial number) as related to the product.

The operation 1510 may correspond to the method operations 104, 204, 406, 504 and 604

In operation 1512, the electronic interface is provided with 'hyperlinks' to access the added products from the corresponding 'E-com partner' or 'aggregator' which flaunt the products for further transactions. Moreover, such hyperlinks may be pre-fed with usecredentials to allow the user at accessing the personalized profiles as rendered by the e-com partners.

In operation 1514, the user is allowed to observe the products as rendered at one or more 'e-com partner' sites. Such observation may be further followed with commercial transactions such as sale, purchase, renting, and hypothecation in respect of the added products as assisted by the E-com partners.

The operations 1512 and 1514 may jointly correspond to the operation 606 of FIG. 6.

Figure 16:
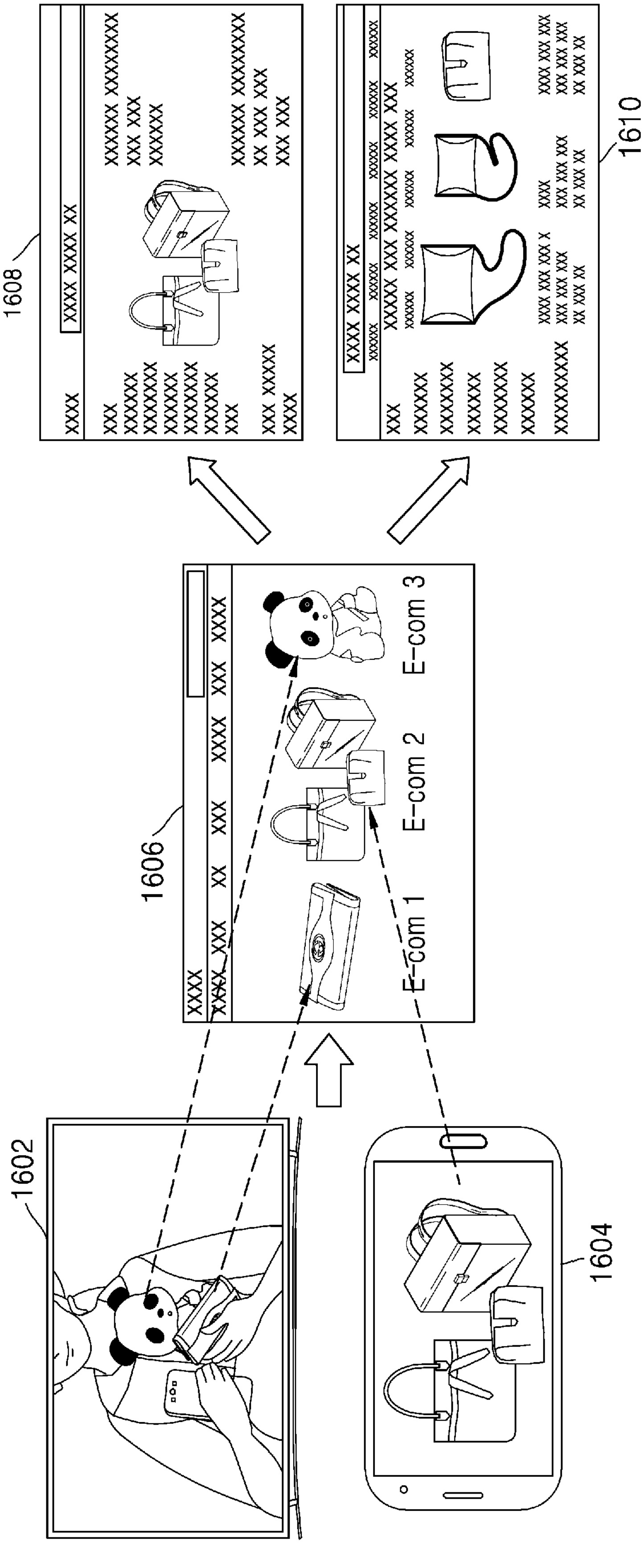
FIG. 16 illustrates an exemplary graphical representation of the process of FIG. 15 in accordance with the embodiment of the disclosure.

FIG. 16 illustrates an exemplary graphical representation of the process of FIG. 15 in accordance with the embodiment of the disclosure. As depicted in FIG. 16, while reference numerals 1602 and 1604 represent the display cum computing-devices rendering the television broadcast, an electronic interface 1606 represents the added products and hyperlinks to access the 'E-com partners' represented as 'e-com1', 'e-com2', 'e-com 3' for the purposes of transacting with the added products. Any notification merely indicating the addition of product may be rendered through a display device such as a smart-watch or through display cum computing-device (e.g. mobile-phone).

Finally, websites 1608, 1610 gets actuated upon clicking of either of the 'hyperlinks' as presented upon the interface 1606, such that the websites 1608, 1610 correspond to either one of the 'e-com 1', 'e-com 2', 'e-com 3'. As may be understood, the electronic-interface 1606 and the websites 1608, 1610 get rendered by the display cum computing-devices.

Figure 17:
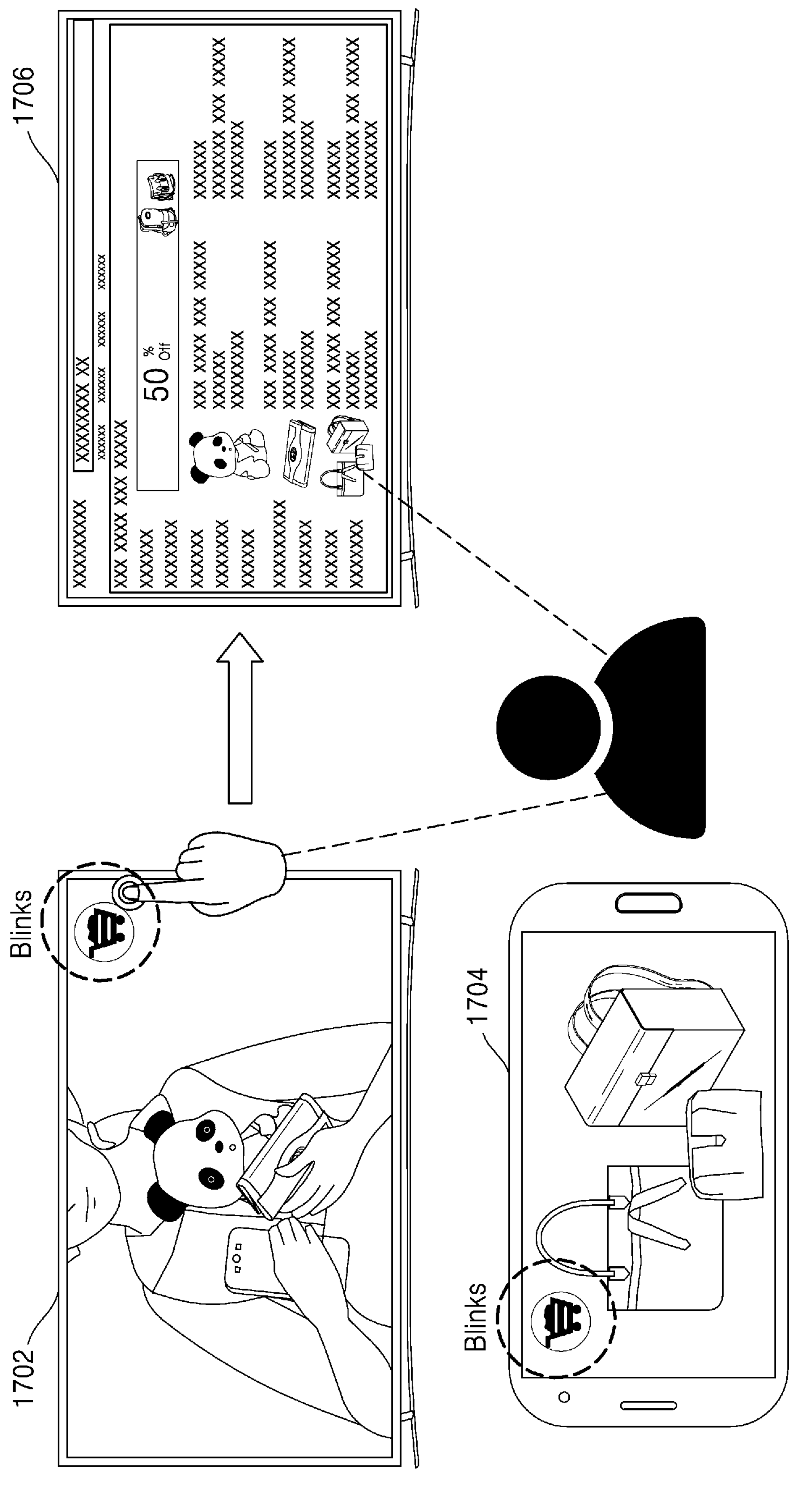
FIG. 17 illustrates an exemplary graphical representation of the process flow of FIG. 15 in accordance with an embodiment of the disclosure.

FIG. 17 illustrates an exemplary graphical representation of the process flow of FIG. 15 in accordance with an embodiment of the disclosure. As depicted in FIG. 17, as the user is viewing the television broadcast at the display cum computing devices 1702, 1704, there are products shown in the broadcast that get added into the interface 1706. Upon such addition, one or more corresponding products in the broadcast (rendered by the devices 1702, 1704) also gets overlaid with an identifier that 'BLINKS' to depict the concurrently happened addition. Such 'identifier' or 'indicator' as overlaid also acts the hyperlink to reach the corresponding website of the respective 'E-com partner' or 'aggregator'. In another example, the identifier may also lead the user to the interface (i.e. wish cart) as rendered within the computing-device. Further, any notification merely indicating the addition of product may be rendered through a display device such as a smart-watch or through display cum computing-device.

Figure 18:
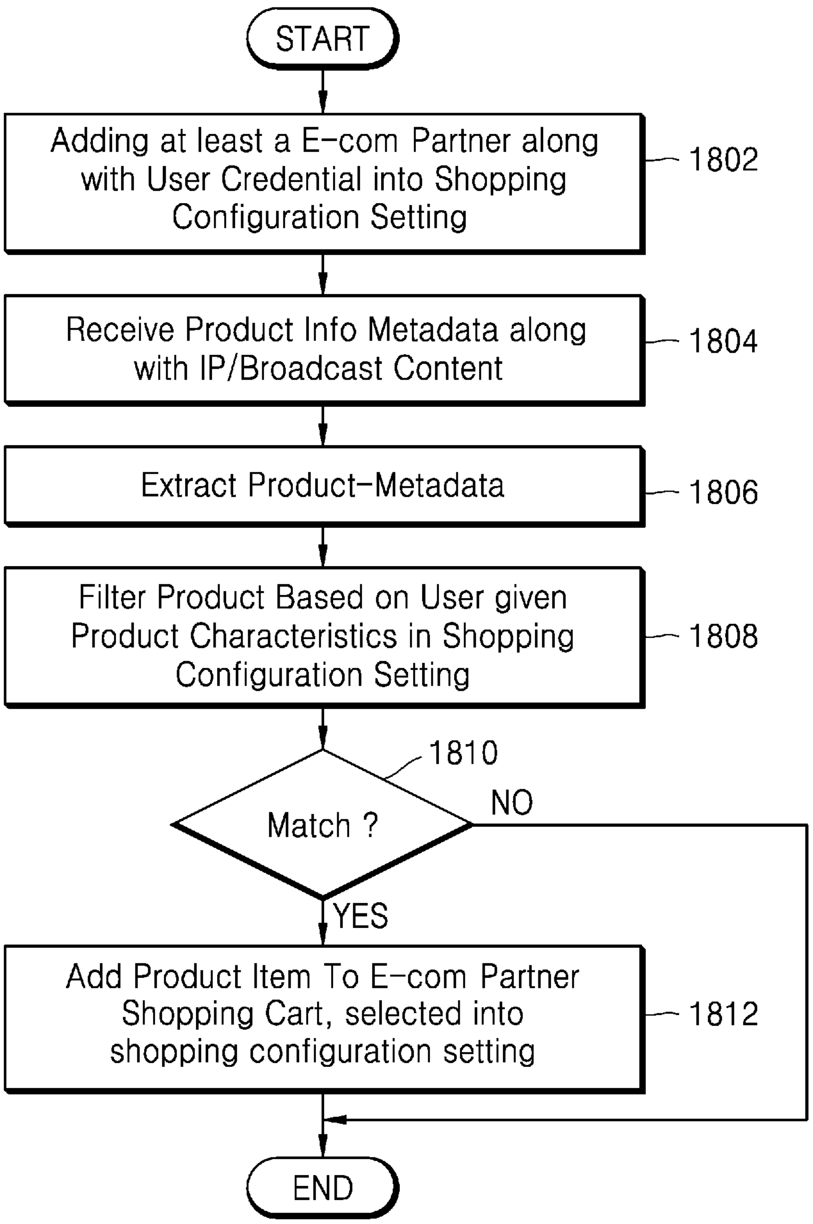
FIG. 18 illustrates a flowchart of a method of performing operations in accordance with an embodiment of the disclosure.

FIG. 18 illustrates a flowchart of a method of performing operations in accordance with an embodiment of the disclosure.

In operation 1802, as a part of configuration of the settings (i.e. through the interface 1400), the user enters the names of the preferred 'E-com partners' or 'aggregators' alongwith the user-credentials (i.e. user id/password) to cause addition of products directly into the personalized user-profile as maintained by the 'E-com Partner(s)' or 'aggregators'.

The operation 1804 may correspond to the operation 1504.

Accordingly, the operations 1802 and 1804 corresponds to the method operations 102, 202, 402, 502 and 602.

Further, the operations 1806 to 1810 may respectively correspond to the operations 1504 to 1508 of FIG. 15.

In operation 1812, the captured-products are added directly as a part of the personalized electronic interface of the 'E-com Partner' or 'aggregator' in-line with the configuration-settings as done by the user in operation 1812.

Accordingly, the operations 1806 to 1812 may correspond to the operations 204, 406, 504 and 604 of preceding figures.

Figure 19:
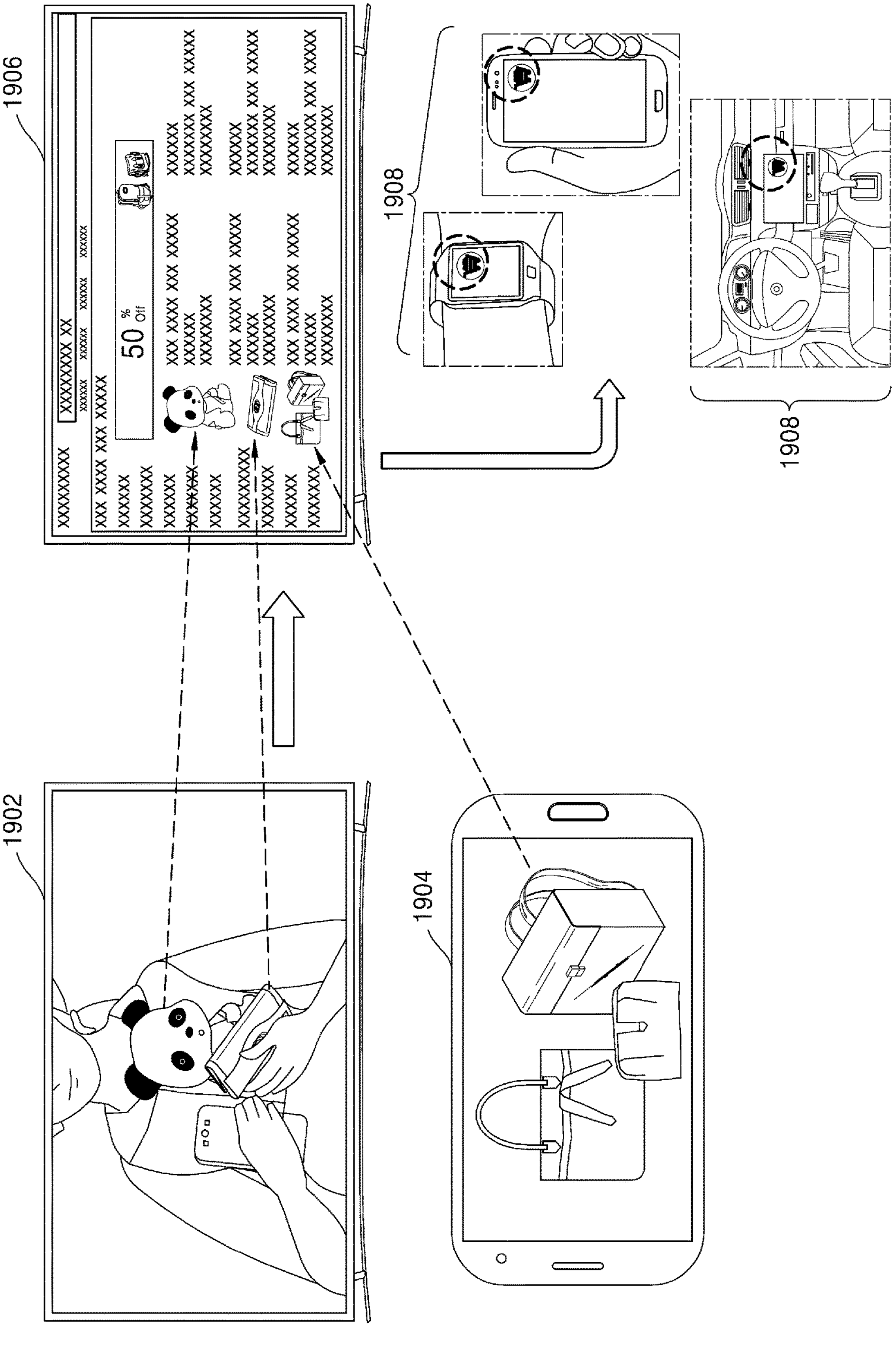
FIG. 19 illustrates an exemplary graphical representation of the process flow of FIG. 18 in accordance with an embodiment of the disclosure.

FIG. 19 illustrates an exemplary graphical representation of the process flow of FIG. 18 in accordance with an embodiment of the disclosure. As shown in FIG. 19, the products within the display content or the television broadcast are rendered within the display cum computing devices 1902, 1904 and are also tagged (e.g. with invisible identifiers) to enable capturing into the electronic interface 1906 or the shopping cart. Based upon the user's preferred aggregator or E corn partners (selected as a part of configuration settings), the tagged products are added directly as the user's personalized-profile as maintained by the preferred aggregators. It may be understood, an otherwise tagged product within the broadcast may not be available for addition into the electronic interface of the preferred E-com partner owing to non-availability of the product with the preferred e-com partner.

Further, the addition of product at the interface 1906 renders a notification to that effect at another set of devices 1908. Within the devices referred by reference numeral 1908, while the smartphone is a display cum computing device, the car-dashboard based device and the smart-watch may be only a display device for depicting the notification and not executing the rendering of the broadcast content.

Figure 20:
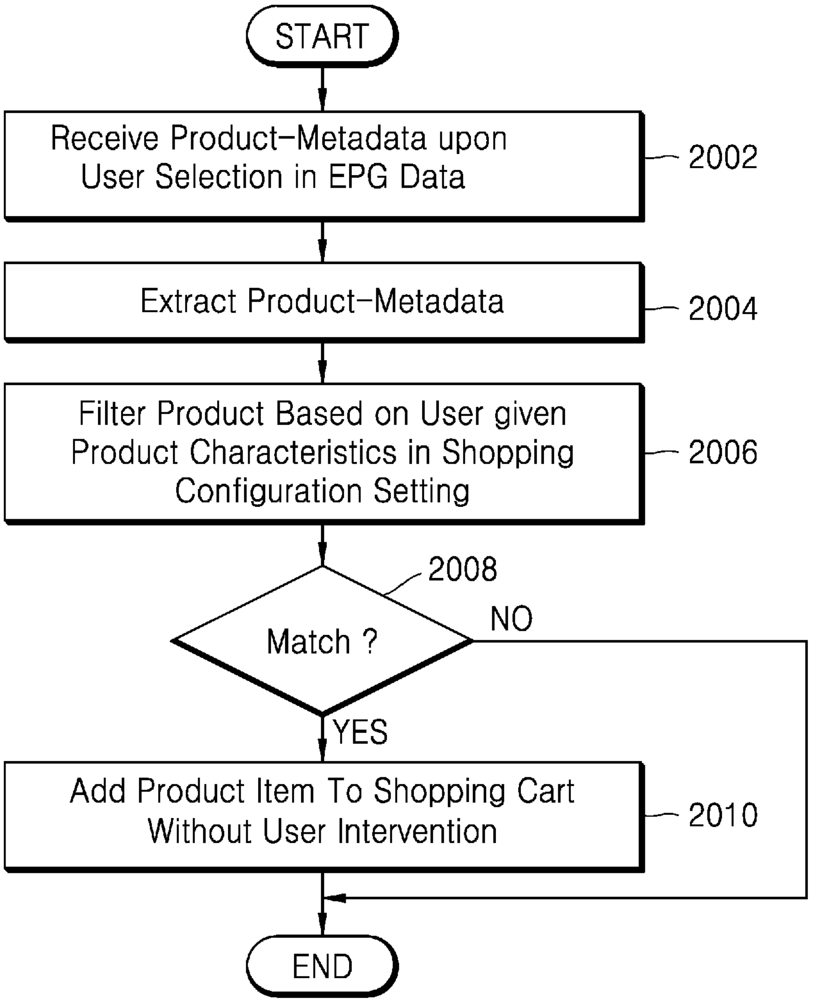
FIG. 20 illustrates a flowchart of a method of performing operations in accordance with an embodiment of the disclosure.

FIG. 20 illustrates a flowchart of a method of performing operations in accordance with an embodiment of the disclosure. More specifically, the implementation of FIG. 20 allows the user to access added product or analogs through the interface from an electronic program guide or an equivalent interactive program guide. Such access is based on a selection of at least one historical or currently-broadcast event in respect of the display-content from the guide.

In operation 2002, an electronic program guide (EPG) is activated by the user to select the preferred products to be added into the interface. Such EPG is rendered as a part of the television-broadcast as received through satellite, terrestrial network or Internet Protocol. Based upon a user-selected item (e.g., a daily soap opera) within the EPG, the 'product-metadata' is gathered based upon the nature of telecast-serial and the date/time. Since the selected option from EPG may be an already concluded broadcast (or a historical broadcast), accordingly the product-metadata may be fetched from a designated repository. Likewise, in case the EPG is devoid of metadata, then the correlated metadata may be fetched from the cloud server or any other remotely-located external storage.

The operation 2004 may correspond to the operation 1504. Accordingly, the operations 2002 and 2004 may correspond to the operations 102, 202, 402, 502 and 602.

Further, the operations 2006, 2008, and 2010 may correspond to the operations 1506, 1508, and 1510, respectively. More specifically, the operation 2010 denotes addition of products corresponding to the selected EPG data to the interface. Accordingly, the operation 2010 may correspond to the operation 204, 406, 504 and 604 of preceding figures.

In another example, the EPG based interface may be customized in accordance with the interface as depicted in FIG. 13. Accordingly, the historically-broadcast programs may be listed along with the corresponding channel and products as would have been a part of the content during the broadcast. Accordingly, such customized-interface may not only present a record of the broadcast programs but also inform a user well in advance about products associated with the particular product.

Figure 21:
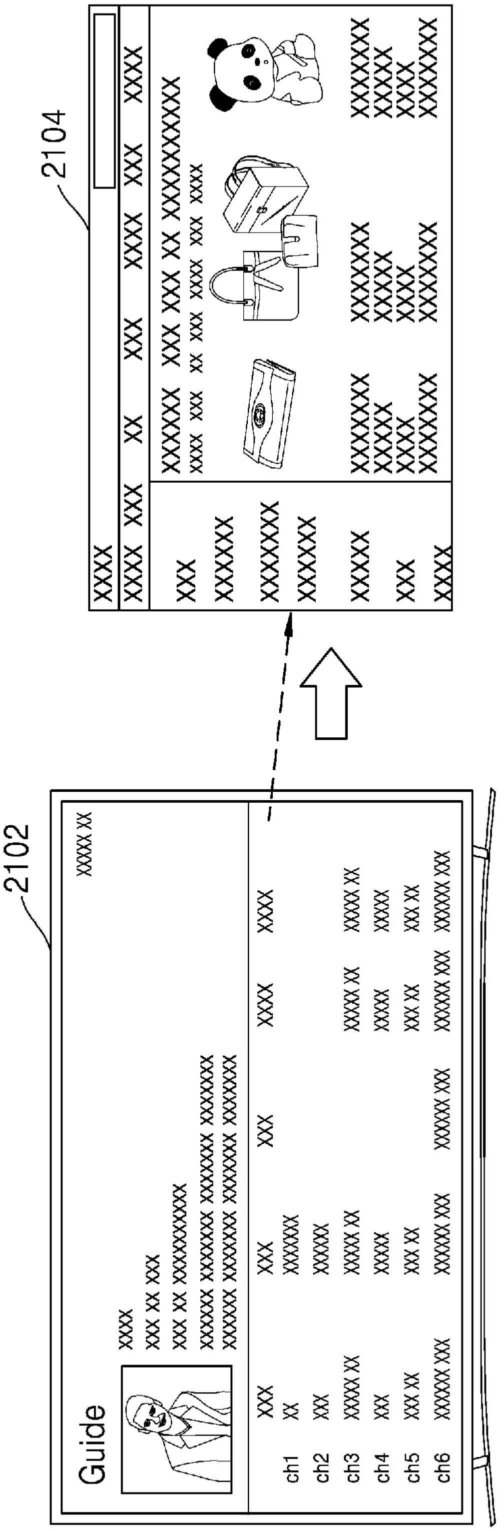
FIG. 21 illustrates an exemplary graphical representation of the process flow of FIG. 20 in accordance with an embodiment of the disclosure.

FIG. 21 illustrates an exemplary graphical representation of the process flow of FIG. 20 in accordance with an embodiment of the disclosure. As shown in FIG. 20, the Electronic Program Guide (EPG) 2102 is rendered by the television broadcast. Accordingly, based upon the user-selection as performed on the EPG 2102, corresponding products get added in the electronic interface 2104. In another example, the electronic interface as presented in FIG. 13 may substitute for the EPG 2102. Accordingly, products shortlisted from the EPG 2102 by the user may be added to the electronic interface 2104.

Figure 22:
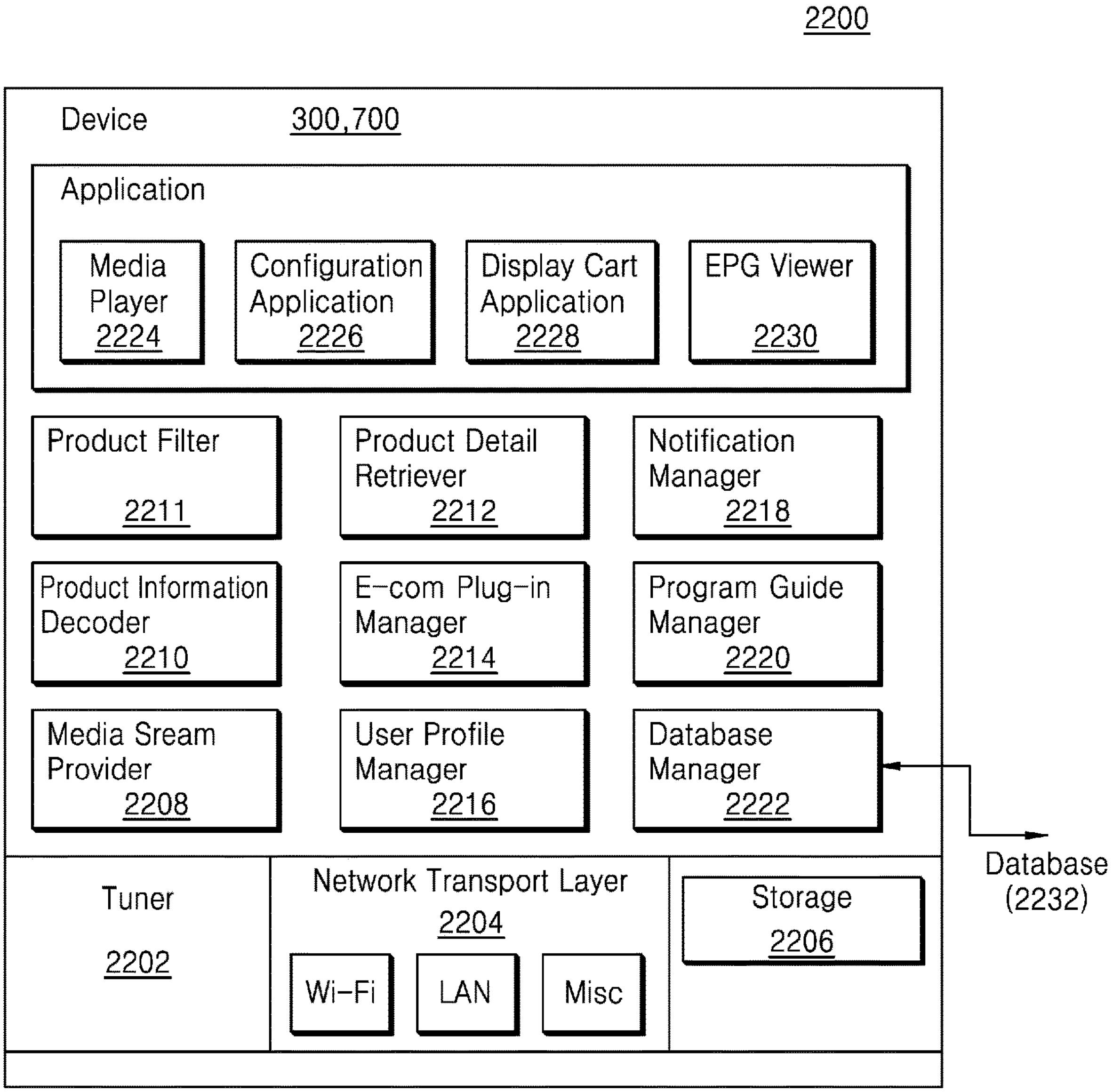
FIG. 22 illustrates an exemplary-implementation of the device 300, 700 in accordance with an embodiment of the disclosure.

FIG. 22 illustrates an exemplary-implementation of the device 300, 700 in accordance with an embodiment of the disclosure. The receiver 302, 702 and the processor 304 and 704 may be implemented through the operational interaction of a plurality of modules, components, protocols, mechanisms as listed below.

A tuner 2202 may be hardware that receives the television broadcast (satellite, terrestrial etc) based from a service provider or a television broadcaster. Regarding the received television broadcast that is in accordance with Internet-Protocol (IP), the tuner 2202 may be replaced by an appropriate electronic component that decodes the television broadcast as encoded in the Internet-protocol.

A Network Transport Layer 2204 provides Internet-protocol-based connectivity for communicating (through an Internet protocol) with the various devices such as mobile-phone, smart-watch, etc. and accessing television broadcast formatted in accordance with an Internet-protocol.

A storage 2206 may store the recorded media content for offline viewing. Moreover, the details pertaining to the electronic interface or the shopping wish cart such as details pertaining to the added products, user-identity, broadcast-content details, channel details, etc. may also be stored as part of recorded-content.

Further, a media stream provider 2208 may receive the broadcast media through the tuner 2202, the Network Transport Layer 2204, the storage 2206 etc. The media stream may include the media content as well as product-metadata. A product information decoder 2210 may receive the media stream from the Media Stream Provider 2208 and may separate out the product-metadata from the media stream. Further, a Product Filter 2211 may receive product-metadata from the Product Information Decoder 2210. Based on user configuration settings, the Product Filter 2211 may filter the desired product items and provide the filtered product items to a Product Detail Retriever 2212. Thereafter, the Product Filter 2211 may push the product-metadata to the Database 2232 or the storage 2206 for future purpose.

The Product Detail Retriever 2212 may communicate with websites and fetch the product details, like product image, cost, E-com info, etc. An E-com Plug-in Manager 2214 may facilitate an establishment of connection with the respective E-commerce site with the help of supplied user credentials.

A User Profile Manager 2216 may maintain a user profile and E-commerce site user credentials. A Notification Manager 2218 may prepare and transmit a notification to the user regarding newly or already added product in the shopping wish cart, after having secured product details from Product Detail Retriever 2212.

A Program Guide Manager 2220 may extract the product-metadata from the electronic program guide (EPG). In another example, after finding the program from the EPG, the Program Guide Manager 2220 may fetch product-metadata from the Database 2232 or the storage 2206, which may be a combination of databases of the corresponding content-broadcaster, cloud-based storage or a vendor of the products. A Database Manager 2222 may provide an interface to other components to interact with the Database 2232 to store, fetch, and delete product-metadata.

A Media Player 2224 may provide an interface to a user to view the media content, notifications, shopping wish cart, configuration settings etc. A Configuration Application 2226 may manage user configuration for the shopping wish cart and interact with the Database Manager 2222 to store/edit the configuration settings into the Database 2232.

A display Cart Application 2228 may interact with the Product Detail Retriever 2212 to prepare the electronic interface/cart, i.e., the shopping-wish cart and may provide it to the Media Player 2224 for displaying to the user. An EPG Viewer 2230 may interact with the Program Guide Manager 2220 to fetch the product-metadata and pass it to Product Detail Retriever 2212 to fetch elaborate-details about the product and pass it to Display Cart Application 2228.

The Database 2232 may store product-metadata and shopping configuration settings. The Database 2232 may be a local database or part of a cloud.

Further, the product-metadata as encrypted within the television broadcast may include a product code and/or a product URL. While the product code may be a unique identifier for the product-identification, the product URL may be a web-link to retrieve more information about the Product. The information to be retrieved may be in an example a product name, a thumbnail image of a product, a price, etc.

Still further, the product (information) metadata as stored in the database may be of the following format:

| |
|---|
| Product Data <> |
| Product Code: <...> |
| Product URL: <...> |
| Program Name:<...> |
| Channel No. <...> |
| User ID <...> |

While "Program Name" denotes the name of 'media program' with which the product is associated, the "Channel No" depicts the channel number associated with the media program. Likewise "User Id" depicts the profile-name of the user. When the configuration settings as depicted in FIG. 14 is used, the user sets product-specific information in the configuration settings, e.g., for selecting product such as "clothes", and selects the sub-categories such as "Dress Type", "Long Dress", Color: "Red", Program: "Gilmore Girls", Channel: "123", etc. The above-given configuration data is stored into the Database 2232 by using the Database Manager 2222. When the user is viewing the television broadcast (as received and tuned through the Tuner 2202 or Network Transport Layer 2204), the Media Stream Provider 2208 may fetch the media stream (that also contains the product-metadata) and provides it to Product Information Decoder 2210. The Product Information Decoder 2210 may decode the incoming stream and separates 'product-metadata' information from the incoming stream.

Further, the product-metadata is transmitted to the Product Filter 2211 so that user-desired product may be filtered out based on the configuration setting stored in the Database 2232, with the help of Database Manager 2222. The filtered product-metadata is stored into the storage 2206 or the Database 2232 with the help of Database Manager 2222 for future use.

Further, similar filtered product-metadata is transmitted to the Product Detail Retriever 2212 to obtain detailed information about the product (e.g., a product image, cost, E-commerce info, etc.) through the web. The Product Detail Retriever 2212 transmits the detailed product-metadata to the Notification Manager 2218 to prepare and send a notification to the user regarding newly or already added product in the cart. When the user chooses to view the electronic interface based on the received notification, the Display Cart Application 2228 may prepare a shopping-wish cart and provides the shopping-wish cart to the Media Player 2224 for displaying to the user.

Except for the storage 2206 and/or Applications, other components in the device 300, 700 may be implemented as one or more hardware processor.

Figure 23:
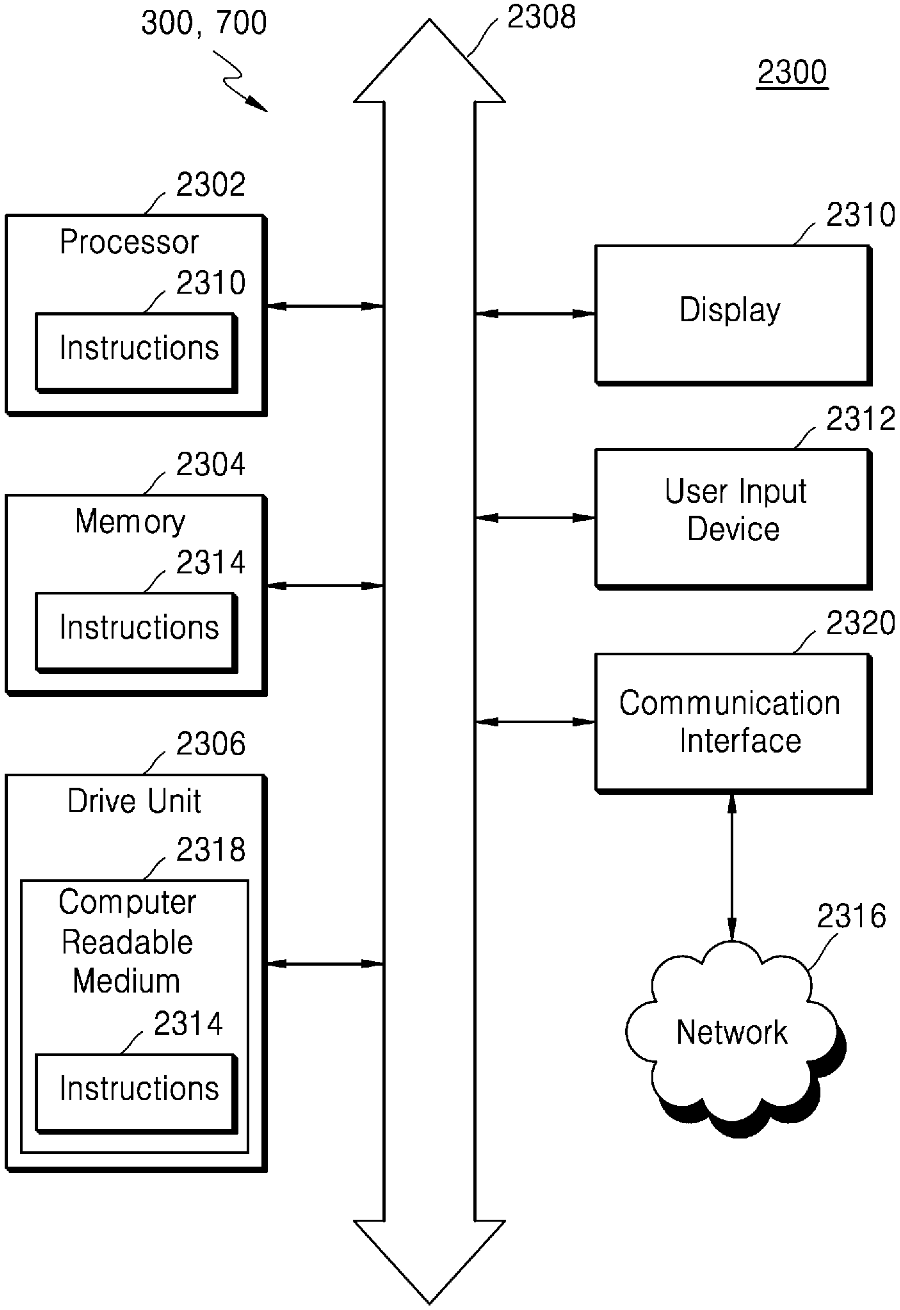
FIG. 23 illustrates another example of implementing the device 300, 700 in the form of a computer system 2300 in accordance with an embodiment of the disclosure.

FIG. 23 illustrates another example of implementing the device 300, 700 in the form of a computer system 2300 in accordance with an embodiment of the disclosure. The computer system 2300 may include a set of instructions that may be executed to cause the computer system 2300 to perform any one or more of the methods disclosed herein. The computer system 2300 may operate as a standalone device or may be connected, e.g., using a network, to other computer systems or peripheral devices.

In a networked deployment, the computer system 2300 may operate in the capacity of a server or as a client user computer in a server-client user network environment, or as a peer computer system in a peer-to-peer (or distributed) network environment. The computer system 2300 may also be implemented as or incorporated across various devices, such as a personal computer (PC), a tablet PC, a personal digital assistant (PDA), a mobile device, a palmtop computer, a laptop computer, a desktop computer, a communications device, a wireless telephone, a land-line telephone having a touchscreen user interface, or any other machine capable of executing a set of instructions (sequential or otherwise) that specify actions to be taken by that machine. In a preferred implementation, the computer system 2300 may be a mobile computing cum display device capable of being used by a user, e.g., a smart-watch, a virtual-reality device, an augmented-reality headgear, a wearable mobile-phone etc. Further, while a single computer system 2300 is illustrated, the term "system" is to be taken to include any collection of systems or sub-systems that individually or jointly execute a set, or multiple sets, of instructions to perform one or more computer functions.

The computer system 2300 may include a processor 2302, e.g., a central processing unit (CPU), a graphics processing unit (GPU), or both. The processor 2302 may be a component in a variety of systems. For example, the processor 2302 may be part of a standard personal computer or a workstation. The processor 2302 may be one or more general processors, digital signal processors, application specific integrated circuits, field programmable gate arrays, servers, networks, digital circuits, analog circuits, combinations thereof, or other now known or later developed devices for analyzing and processing data. The processor 2302 may include a software program, such as code generated manually (i.e., programmed).

The computer system 2300 may include a memory 2304, such as a memory 2304 that may communicate via a bus 2308. The memory 2304 may include, but is not limited to, computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In an example, the memory 2304 includes a cache or random access memory for the processor 2302. In another example, the memory 2304 is separate from the processor 2302, such as a cache memory of a processor, the system memory, or other memory. The memory 2304 may be an external storage device or database for storing data. The memory 2304 is operable to store instructions executable by the processor 2302. The functions, acts or tasks illustrated in the figures or described may be performed by the programmed processor 2302 executing the instructions stored in the memory 2304. The functions, acts or tasks are independent of the particular type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like.

The computer system 2300 may include a Display 2310 which may be touch-sensitive, for outputting information as well as receiving a user's touch-gesture based inputs, such as drag and drop, single tap, multiple-taps, etc. The Display 2310 may act as an interface for the user to see the functioning of the processor 2302, or specifically as an interface with the software stored in the memory 2304 or in the Drive Unit 2306.

In an example, the computer system 2300 may include a User Input Device 2312 configured to allow a user to interact with any of the components of computer system 2300. The computer system 2300 may also include a Drive Unit 2306. The Drive Unit 2306 may be a disk drive unit and/or optical drive unit. The Drive Unit 2306 may include a computer-readable medium 2318 in which one or more sets of instructions 2314, e.g. software, can be embedded. Further, the instructions 2314 may embody one or more of the methods or logic described herein. In an example, the Instructions 2314 may reside completely, or at least partially, within the Memory 2304 or within the Processor 2302 during execution by the computer system 2300.

The present disclosure includes a computer-readable medium that may include Instructions 2314 or receive and execute Instructions 2314 in response to a signal so that a device connected to a Network 2316 may communicate voice, video, audio, images or any other data over the Network 2316. Further, the Instructions 2314 may be transmitted or received over the Network 2316 via a Communication Interface 2320 or using a Bus 2308. The Communication interface 2320 may be a part of the processor 2302 or may be a separate component. The Communication Interface 2320 may include software or hardware. The Communication Interface 2320 may be configured to connect to the Network 2316, external media, the Display 2310, or any other components in system 2000, or combinations thereof. The connection to the Network 2316 may be established wirelessly as discussed later. Likewise, the additional connections with other components of the system 2300 may be established wirelessly. The Network 2316 may be directly connected to the Bus 2308.

The Network 2316 may include wireless networks, Ethernet AVB networks, or combinations thereof. The wireless network may be a cellular telephone network, an 802.11, 802.16, 802.20, 802.1Q or WiMax network. Further, the Network 2316 may be a public network, such as the Internet, a private network, such as an intranet, or combinations thereof, and may utilize a variety of networking protocols now available or later developed including, but not limited to TCP/IP based networking protocols. The system is not limited to operation with any particular standards and protocols. For example, standards for the Internet and other packet switched network transmission (e.g., TCP/IP, UDP/IP, HTML, HTTP) may be used.

The disclosure as illustrated enables an automatic addition of products (whether all products or user-specified ones) into a cart seen by a user. The disclosure allows directly adding, without user intervention, a product item to a virtual wish cart or e-commerce cart while the user is watching/viewing live broadcast or IP content or recorded content. The disclosure is suitable for live broadcast content, IP content, or recorded content having product details or metadata incorporated therein. Accordingly, the disclosure enables simultaneous viewing of a playing multimedia and addition of products to a cart, whose details are available into a stream and currently appearing in multimedia.

Further, the disclosure enables an addition of products into a cart, which either have not been viewed by the user or have been historically broadcast. For example, if a user misses a program which is otherwise available in an EPG table, then the user may select a program/show from the program table (EPG) (as also rendered by the broadcaster). Since the corresponding product metadata is available for the selected program/show from the broadcaster, an entire list of products corresponding to that program/show may be added and listed into a virtual or e-commerce cart directly or by user selection. Alternately, all the applicable products, prior to being added in the electronic-interface or the cart, could be shown to the user for initial observation, and thereafter added to the cart only upon receipt of a user selection in the form of an input.

Further, the disclosure enables adding product-items to a virtual cart or an e-commerce cart directly based on a user pre-selection for program or channel or genre or time. If the user wants to add product to a cart during a specific program, channel, show (based on genre) or time (ex. late night [9 PM-12 PM], afternoon show [3 PM-7 PM] etc.), a product for the same selection may be directly added to a virtual or e-commerce cart without any user further intervention during watching multimedia on a user display device.

Further, the disclosure enables a visual representation to the user by overlaying a moving "Shopping" based logo on the playing multimedia for a pre-defined duration. The logo may indicate the presence of products within the broadcast as available for observation and transaction through the electronic interfaces/shopping carts.

Further, the disclosure enables a user to configure a setting (e.g., a channel wise, genre-wise, Program wise, product type etc.), so that only the desired product based on criteria may be added as a personalized product as a part of a user profile. Accordingly, multiple user profiles lead to an addition of different products, each product corresponding to one or more user profile. Moreover, a product added to a particular user profile may also be recommended to another user profile.

Overall, the disclosure enables an addition of a product to a cart without a manually performed user selection and without creating any television-viewership disturbance, thereby enabling a user to look out for products upon viewing the broadcast and execute further transactions. Accordingly, even if the product appeared within a single frame or barely for seconds in the broadcast, the product may still be added as an eligible product to the interface. Further, if the user misses a broadcast program, the user is facilitated to access such product-details through the EPG mechanism and enable further transactions.

Further, the products as added to the interface may be the ones as available for a transaction within the locality or city of the user. Moreover, the added products may be either the exact products as appearing with the broadcast or equivalents/substitutes.

While specific language has been used to describe the disclosure, any limitations arising on account of the same are not intended. As would be apparent to one of ordinary skill in the art, various working modifications may be made to the method and system of the disclosure in order to implement the inventive concept as taught herein.

The drawings and the foregoing description show examples of the disclosure. One of ordinary skill the art will appreciate that one or more of the described elements may be combined into a single functional element. Also, certain elements may be split into multiple functional elements. Elements from one embodiment may be added to another embodiment. For example, orders of processes described herein may be changed and are not limited to the manners described herein.

Moreover, the actions of any flow diagram need not be implemented in the order shown, nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The invention claimed is:

1. A method of managing an interface of a device, the method comprising:

receiving, at the device, content from a source device;

tagging, using at least one invisible identifier, at least one product to a frame in at least one television program for broadcast;

extracting product-metadata by decoding the content with a product information decoder, wherein the product-metadata represents the at least one product to be displayed as part of the content;

filtering the product-metadata based on at least one user configurable settings which comprises a user's preference related to the at least one product and at least one of a reward-on-purchase of the at least one product, the at least one television program related to the at least one product, or at least one television-channel broadcasting the at least one television program related to the at least one product;

controlling to add, without user intervention, the at least one product or an analog thereof related to the product-metadata to the interface of the device from an external source device other than the source device based on the filtered product-metadata, wherein the controlling to add without user intervention is based on detection by the device of the tagged at least one product to the frame in the at least one television program;

displaying, in a predetermined format, a plurality of products including the added at least one product or the added analog thereof related to the product-metadata, wherein each of the plurality of products is displayed with a television channel name of which channel broadcast each of the plurality of products, a television program title in which each of the plurality of products is broadcast, time information when a television program corresponding to the television program title is broadcast, a rating of each of the plurality of products, and price information of each of the plurality of products in a mapped state on the interface of the device; and receiving a notification of the addition of the at least one product or the added analog thereof related to the product-metadata, wherein the user preference comprises at least one of product category, product type, product color, TV program related to the product, or a channel of the TV program related to the product.

2. The method of claim 1, wherein the interface of the device comprises an electronic shopping cart.

3. The method of claim 1, wherein the controlling to add comprises:

controlling to add the at least one product or the analog thereof based on the at least one user configurable settings which further comprises one or more user profiles, or an analogue of the at least one product.

4. The method of claim 1, wherein the controlling to add comprises:

fetching product information comprising at least one of price, product details, model number, manufacturer, brand name, an expiry data of the at least one product from the external source device other than the source device based on the filtered product-metadata.

5. The method of claim 1, wherein the controlling to add comprises:

controlling to annotate the at least one product with an identifier representing whether the at least one product is available for sale.

6. The method of claim 1, further comprising:

receiving a user input identifying one or more products among the at least one product at the interface of the device; and displaying a shortlist comprising the identified one or more products.

7. The method of claim 1, wherein the product-metadata comprises at least one of a shopping platform, a product code identifying the at least one product, and a product URL linking to a website including information about the at least one product.

8. The method of claim 1, wherein the controlling to add the at least one product comprises:

triggering the adding of the at least one product or the analog thereof related to the product-metadata in a mapped relationship with the content, at the interface of a web-enabled application rendered on the device.

9. The method of claim 8, wherein the mapped relationship between the product-metadata and the content is based on parameters comprising at least one of broadcasting channel name, broadcasting program information, broadcasting program show-time, broadcasting genre, and a viewer of the content.

10. The method of claim 8, further comprising:

identifying the web-enabled application based on the product-metadata prior to the triggering.

11. The method of claim 8, further comprising:

transmitting the product-metadata to a content manager of a web-enabled service provider for updating user's account maintained by the content manager based on the product-metadata.

12. The method of claim 8, further comprising:

receiving user credentials during a user-login process for allowing the user to access the added at least one product through a user-profile based on a web-enabled service provider, wherein the user-profile relates to a user subscription and is used to render a personalized interface.

13. An apparatus of managing an interface, the apparatus comprising:

a display;

a receiver configured to receive content from a source device; and a processor configured to:

decode the content by controlling a product information decoder, tag, using at least one invisible identifier, at least one product to a frame in at least one television program for broadcast, extract product-metadata based on the decoding of the content, wherein the product-metadata represents the at least one product to be displayed as part of the content on the display, filter the product-metadata based on at least one user configurable settings which comprises a user's preference related to the at least one product at least one of a reward-on-purchase of the at least one product, the at least one television program related to the at least one product, or at least one television channel broadcasting the at least one television program related to the at least one product, control to add, without user intervention, the at least one product or an analog thereof related to the product-metadata to the interface based on the filtered product-metadata, wherein the controlling to add without user intervention is based on detection by the device of the tagged at least one product to the frame in the at least one television program, control to display, in a predetermined format on the display, a plurality of products including the added at least one product or the added analog thereof related to the product-metadata, wherein each of the plurality of products is displayed with a television channel name of which channel broadcast each of the plurality of products, a television program title in which each of the plurality of products is broadcast, time information when a television program corresponding to the television program title is broadcast, a rating of each of the plurality of products, and price information of each of the plurality of products in a mapped state on the interface of the apparatus, and receive a notification of the addition of the at least one product or the added analog thereof related to the product-metadata, wherein the user preference comprises at least one of product category, product type, product color, TV program related to the product, or a channel of the TV program related to the product.

14. The method of claim 1, wherein the at least one product is tagged with at least one of QR code or digital watermarking.

* * * * *